United States Patent [19]

Mangulis

[11] Patent Number: 4,532,635
[45] Date of Patent: Jul. 30, 1985

[54] SYSTEM AND METHOD EMPLOYING TWO HOP SPREAD SPECTRUM SIGNAL TRANSMISSIONS BETWEEN SMALL EARTH STATIONS VIA A SATELLITE AND A LARGE EARTH STATION AND STRUCTURE AND METHOD FOR SYNCHRONIZING SUCH TRANSMISSIONS

[75] Inventor: Visvaldis Mangulis, East Brunswick Township, Middlesex County, N.J.

[73] Assignee: RCA Corporation, Princeton, N.J.

[21] Appl. No.: 524,542

[22] Filed: Aug. 19, 1983

[51] Int. Cl.³ .............................................. H04B 7/185
[52] U.S. Cl. ......................................... 375/1; 455/13; 370/104; 375/107; 375/115
[58] Field of Search .................... 375/1, 107, 109, 115, 375/3, 4; 455/12, 13; 343/7 PL, 353, 358; 370/104, 107

[56] References Cited

U.S. PATENT DOCUMENTS

| | | | |
|---|---|---|---|
| 3,836,721 | 9/1974 | Sugioka | 370/104 |
| 3,982,075 | 9/1976 | Jefferis et al. | 370/104 |
| 4,231,114 | 10/1980 | Dolikian | 455/49 |
| 4,361,886 | 11/1982 | Gutleber | 455/12 |
| 4,455,651 | 6/1984 | Baran | 370/104 |

Primary Examiner—Benedict V. Safourek
Attorney, Agent, or Firm—Joseph S. Tripoli; Robert L. Troike; William H. Meise

[57] ABSTRACT

In a data communication system including a plurality of small earth stations (SES), a satellite, and a master earth station (MES), a method of transmitting signal transmissions, each consisting of a series of bit representing pseudo random sequences (PRS), each consisting of N time synchronous chips between the SESs. The steps of the method include generating at selected SESs a stream of PRS signals having bit and chip rates $B_{SES}$ and $C_{SES}$ and having pause periods that occur periodically in the stream of PRS signals, transmitting the PRS signals via the satellite to the MES as a single composite signal, $B_{SES}$, determining if each $B_{SES}$, $C_{SES}$ and the pause periods of all of the PRS signals from the SESs are in common phase synchronization with each other as they arrive at the MES, generating an error correction code (ECC) which defines the amount and direction of phase deviation of any of $B_{SES}$, $C_{SES}$ or pause periods from common phase synchronization, transmitting the composite signal from the MES to the SESs with common periodic pause periods therein and with the ECC signal contained in such common pause periods, and correcting the phase of $B_{SES}$, $C_{SES}$, and the pause period of each $PRS_{SES}$ at the SESs so that they are phase synchronized with each other at the MES.

6 Claims, 16 Drawing Figures

DETAILED DIAGRAM OF SYNCHRONIZATION ADJUSTER 524 OF FIG. 6

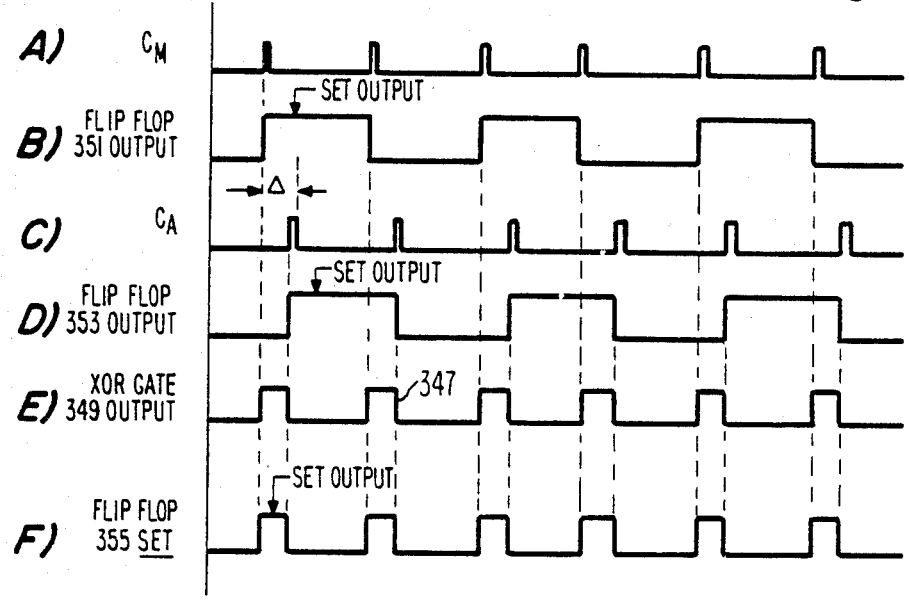
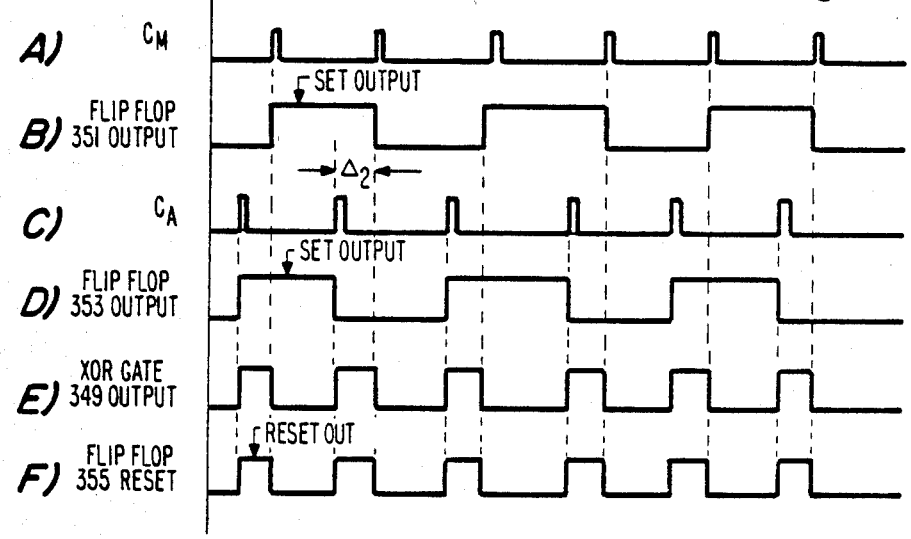

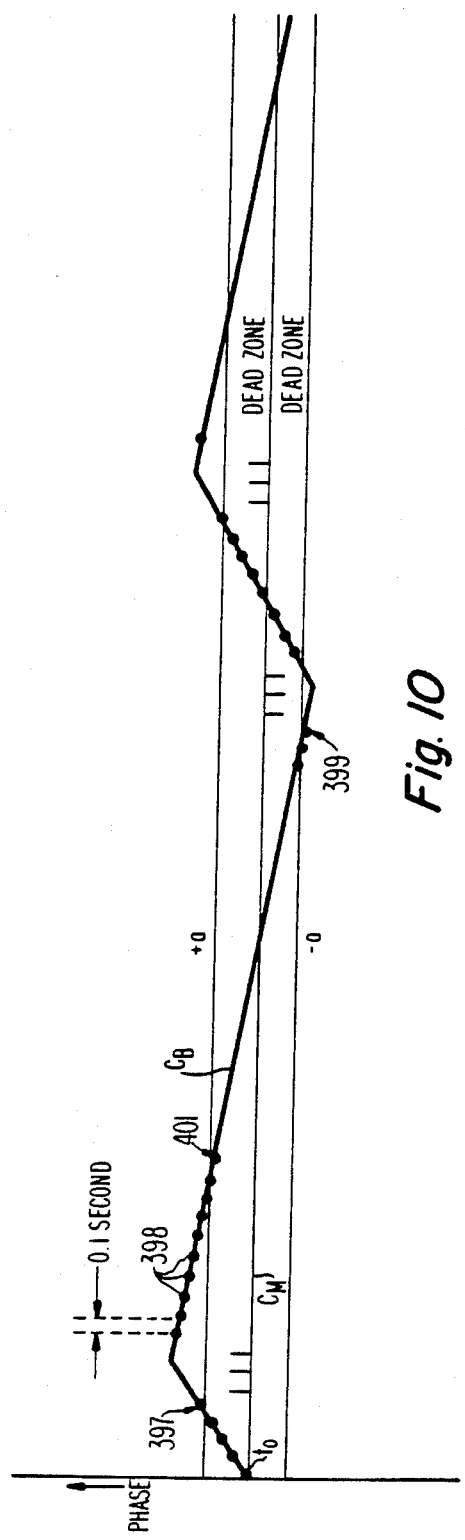

SYSTEM AND METHOD EMPLOYING TWO HOP SPREAD SPECTRUM SIGNAL TRANSMISSIONS BETWEEN SMALL EARTH STATIONS VIA A SATELLITE AND A LARGE EARTH STATION AND STRUCTURE AND METHOD FOR SYNCHRONIZING SUCH TRANSMISSIONS

This invention relates generally to communication systems employing a plurality of earth stations and a common satellite transponder and more particularly to such a system and a method employing spread spectrum transmissions which are all synchronized with each other by means of a common source located preferably at a master earth station whose transmitted signals are observable to all other stations by monitoring the satellite transponder.

In the present invention communication can occur between small earth stations (SES) each having relatively small gain and power. Such communication is accomplished in two transmission hops. In the first hop an SES transmits to a large master earth station (MES) via satellite, and in the second hop the MES retransmits the signal to the receiving SES via satellite. The large MES amplifies the signal power and thus increases the signal-to-noise (S/N) ratio at the receiving SES. The retransmission by the MES is accomplished without a demodulation of the composite first-hop signal.

In prior art systems earth stations can transmit data signals to remote earth stations via a satellite transponder. Similarly, earth stations can receive transmissions from distant earth stations via a satellite. In these systems many earth stations access the same satellite transponder so that the transponder is being used in a multiple access mode.

For example, one could have a system in which synchronized orthogonal signals are transmitted via satellite from one small earth station (SES) to another SES in a single hop. However, if the SESs are very small and do not have much power, then it is advantageous to accomplish the transmission in two hops. In the first hop an SES transmits via satellite to a large master earth station (MES), and in the second hop the MES transmits that signal via satellite to the receiving SES. In essence the MES acts as a signal amplifier.

A general two-hop system which requires a relatively large amount of equipment will be described first. The present invention consists of an improvement on such a general system so as to reduce the amount of equipment.

In the general system, there is an MES and a satellite. Each of the SESs transmits a signal via the satellite to the MES which retransmits the signal back to the satellite and to the intended SES destination. Further, in such a system, each of the SESs contains three receivers. The first receiver is for receiving a transmission from another SES via the satellite and the MES. The second receiver is for receiving a master pseudo random sequence (PRS) signal via the satellite from the MES where it is generated. The third receiver at each SES is to receive a PRS signal generated at the SES and retransmitted back from the satellite. Each of the SESs will compare the phase of the master PRS signal with the particular reference PRS signal which the SES transmitted in order to determine and maintain phase synchronization between the master PRS signal and the reference PRS signal transmitted by the SES.

If such synchronization is maintained between the master PRS and the reference for each SES then synchronization between all transmitted PRS signals will be maintained for each of the SESs, as seen by each such SES.

The use of the MES to retransmit to a second small station a given signal received from a first SES via the satellite enables the system to amplify the signal for retransmission to the receiving second SES and thereby assure greater integrity in the system. It is not desirable to amplify the signal in the satellite because of the limited capacity of the satellite.

However, such a system does require a transmitter and three receivers located at each SES and one transmitter and one receiver for each of the SESs located at the MES, plus one additional transmitter at the MES to transmit the signal to which the SESs synchronize. Thus, there is required a total of 2N+1 transmitters and 4N receivers in a system having N SESs. There could be even more receivers in the system if some SESs listen to more than one SES.

It is a primary purpose of the present invention to provide a spread spectrum satellite transmission system which employs only 2N+1 receivers and N+1 transmitters, where N is the number of SESs, and without significant degradation of system performance.

Further, in the prior art, several multiple access techniques are available. The two techniques most commonly employed are time division multiple access (TDMA) and frequency division multiple access (FDMA). In a system using relatively small earth station antennas, (from 3–4 feet in diameter) both of the foregoing techniques present substantial difficulties. The basic problem with both TDMA and FDMA lies in their interference protection. Small earth stations of the intended size experience substantial interference on reception and on transmission both in terms of interfering with other services or being interfered with because the small antenna size implies low antenna selectivity, i.e., the bore site radiated power relative to the off-axis radiated power.

In a TDMA system the data to be transmitted is buffered and then sent in bursts during a relatively short time interval or window on a periodic basis. Consequently, the average power over the entire period might be low because most of the time no transmission occurs. But during the narrow time windows, when data is being transmitted, the power is relatively high.

In FDMA, the data is transmitted continuously, but since the radiated signal is confined to a small section in a frequency band (so that others can use adjacent bands) the power is concentrated in portions of the frequency spectrum rather than in time as is the case with TDMA transmission.

Hence, especially in terms of the interference potentials from the earth station into other terrestrial services or to adjacent satellites, the concentration of transmitter power in either the time or frequency domains is undesirable. On the other hand, spread spectrum (SS) transmission has a unique distinction in that the power is not concentrated in either time or frequency. Many users can use the same bandwidth simultaneously in the spread spectrum multiple access mode (SSMA). The power produced by a spread spectrum transmitter is relatively constant over time and is spread out over a large frequency range. Depending upon how large such frequency range is, the actual level of any given signal can be lower than the thermal noise received at a given receiver which would tend to interfere with the spread spectrum transmission. Hence, spread spectrum is an extremely desirable modulation method for multiple access of small earth stations.

The spread spectrum (SS) transmission employed in the present invention is the so-called direct sequence method. In the direct sequence method, a bit of information (data bit) is transmitted as a phase shift keyed transmission of a carrier with the phase shift keying being at an extremely rapid rate compared to the data bit rate since there are many time elements per bit. These time elements are conventionally called chips. The signal transmitted in the direct sequence method technique has a unique shift register pattern associated with it, usually called a pseudo random sequence (PRS). The PRS signal is a sequence of high and low level signals defined by the chips each of which is of equal time length, arranged in a random fashion, and representing the phase shifting of the carrier. If a binary 1 is to be transmitted the uninverted PRS signal is employed to modulate the carrier. If a binary 0 is to be transmitted the inverted PRS signal modulates the carrier.

In a typical application of the direct sequence method employing a PRS signal there might be 500-1000 chips in the PRS pattern. The bandwidth occupied by the signal is directly determined by the chip rate which is, in effect, a pseudo data rate. A receiver receiving a PRS signal from a given transmitter has the same PRS pattern stored therein. This stored PRS pattern can be employed to decode and extract the transmitted data even when there are many other stations using the same frequency band at the same time because the other stations are all using PRS signals of different patterns.

While the spread spectrum technique is extremely desirable from the point of view of reducing interference probability from a transmitting station and also from the point of view of reducing interference potential on reception, the efficiency of multiple access spread spectrum as it is conventionally used, i.e., with each station being asynchronous with each other station, is quite low compared with either TDMA and FDMA. In both TDMA and FDMA the signals transmitted by the individual stations are orthogonal to one another, i.e., they either occur at different times or in different frequency bands.

In conventional spread spectrum the waveforms are not orthogonal to each other and a station receiving a desired spread spectrum transmission will also see many other spread spectrum transmissions. While the other spread spectrum transmissions will appear as noise such noise forms a background which makes error probability high unless the number of simultaneous users in the band are kept reasonably low. A primary reason for the above-mentioned difficulties in the prior art spread spectrum systems results from the fact that the transmissions are not synchronized with respect to a common reference. For synchronized sequences it is possible to make those sequences orthogonal to each other, by which we mean that when the product of two such signals is integrated over the bit duration then the integral will be zero unless the two sequences are the same.

It is another primary purpose of the present invention to synchronize all of the chips and all of the bits of all transmission sequences of the various transmitters at the MES, which will result in the orthogonality of all such sequences when the sequences are properly designed. Periodic pause periods which carry error correction command (ECC) signals, when needed, are also synchronized. The foregoing will provide a multiple access spread spectrum system with as high an efficiency as obtainable with TDMA and FDMA systems. A further advantage of the present invention is that the interference protection is greater than that obtainable with the more conventional TDMA and FDMA systems and similar to that of ordinary, unsynchronized spread spectrum systems.

In accordance with a preferred form of the present invention there is provided, in a spread spectrum (ss) communication system, N small earth stations (SES) divided into N/2 pairs of SESs with the SES of each pair communicating bi-directionally with each other, a master earth station (MES), a satellite for receiving ss transmissions from and for transmitting ss transmissions to each of the SESs and to the MES as a composite signal. However, the invention is not confined to SESs which communicate in pairs. The same principles can be applied to many other arrangements.

The MES comprises logic for insuring the reception of all of the ss transmissions from the SESs in bit and chip phase synchronism and further with synchronous common pause periods for the phase error correction command (ECC) signals and for frequency spreading the received composite ss signal further by a PRS signal $PRS_{M2}$ at the MES and retransmitting such further spreaded composite signal at a higher carrier signal power to all of the SESs via the satellite. Each SES responds to the composite SS signal transmitted from the satellite to strip therefrom $PRS_{M2}$ and to multiply the remaining signal by the PRS signal of the transmitting SES of the paired SES, thereby leaving only the data stream transmitted by the transmitting SES.

The MES further comprises logic for transmitting a PRS signal $PRS_{M1}$, for receiving said PRS back from the satellite, for comparing its phase with the PRSs received via satellite from all of the SESs, and for sending an ECC signal to those SESs whose PRS signals have drifted off the phase of $PRS_{M1}$.

Each SES is responsive to an ECC signal directed to it to correct the phase of its PRS signal to be synchronous with the phase of $PRS_{M1}$, as measured at the MES. All ECC signals are transmitted from the MES in a common pause period.

In the drawings

FIGS. 8 and 9 are timing diagrams illustrating the phase corrections made to the PRS signals generated at the SESs;

FIG. 10 is a curve showing chip phase difference vs. time of $C_B$ and $C_M$;

The inventive improvement described herein, which provides for transmission of synchronization of signal transmissions from various SESs, is used in conjunction with conventional spread spectrum transmitters and receivers. It is advantageous, therefore, to first describe a prior art spread spectrum transmitter and receiver.

Figure 1:
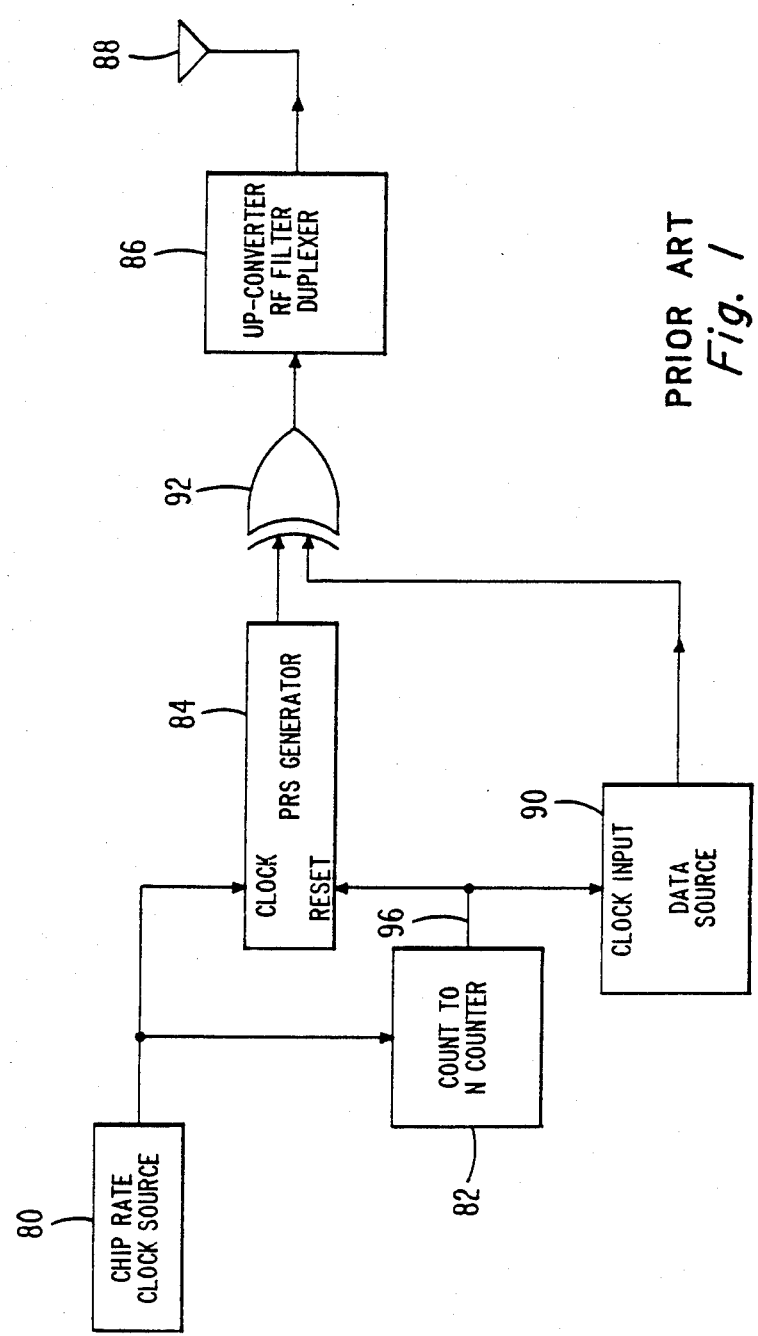
FIG. 1 is a block diagram of a prior art transmitter located at a given ground station.
Figure 2:
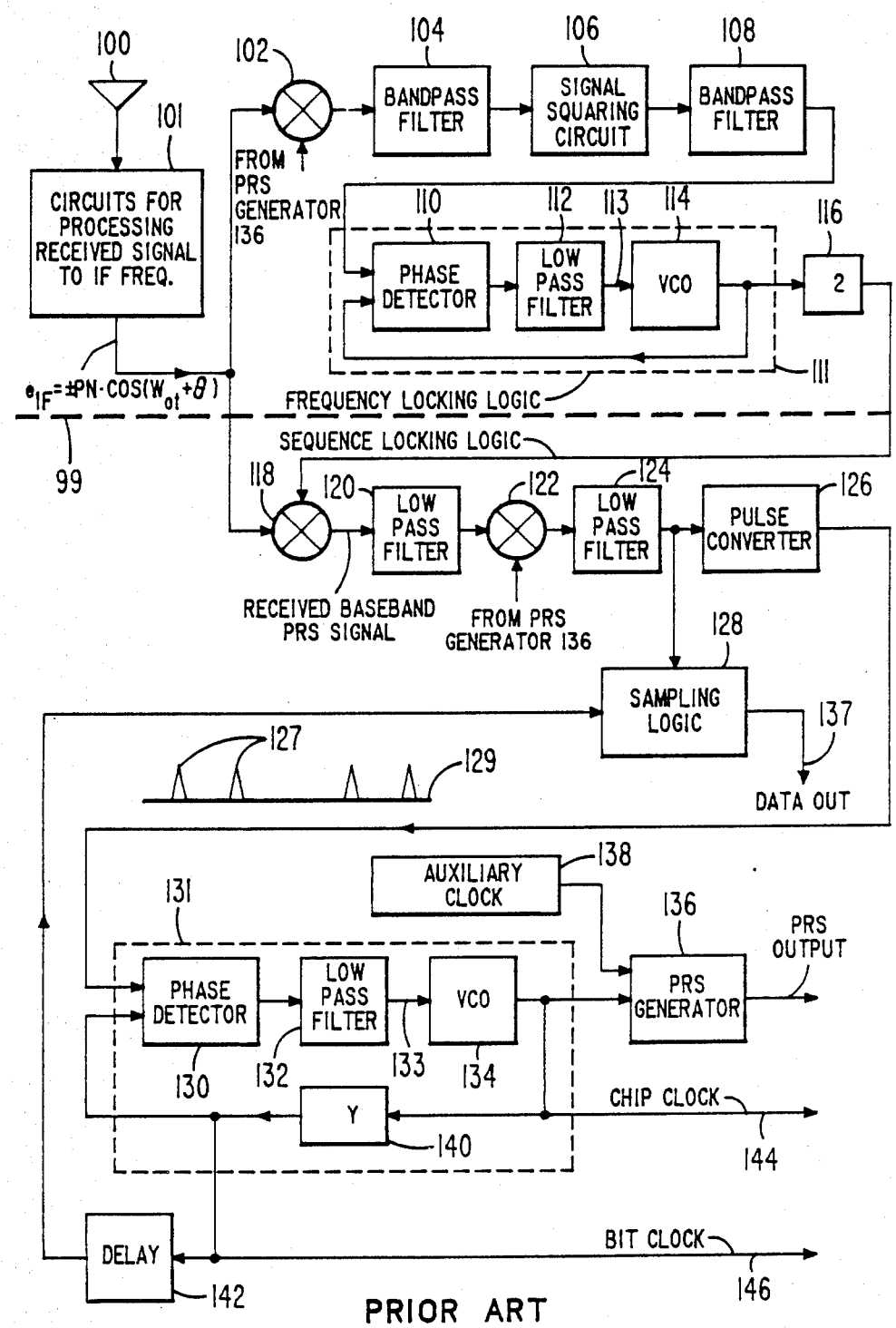
FIG. 2 is a block diagram of a prior art receiver located at the given ground station.

A prior art transmitter portion is shown in FIG. 1 and a prior art receiver in FIG. 2. The transmitter logic of FIG. 1 is relatively simple and consists primarily of a chip rate clock source 80 which supplies clock pulses to counter 82 and to PRS generator 84 which in turn iteratively generates a predetermined PRS signal having a predetermined pattern. Such PRS signal is supplied to one input of Exclusive OR (XOR) gate 92. The bit output of data source 90 is supplied to the other input of XOR gate 92. Synchronization between the output of data source 90 and PRS generator 84 is maintained by the count-of-0 output from counter 82. Depending upon whether a binary 0 or a binary 1 (low or high level signals) is supplied from data source 90 the XOR gate 92 will either invert or not invert the PRS signal supplied from PRS generator 84, thus indicating an encoded binary 0 or binary 1. The output of XOR gate 92 is supplied to logic 86 which processes the signal for transmission.

A portion of a prior art receiver is shown in FIG. 2. A transmitted PRS signal is received via antenna 100 and supplied to circuits within block 101 for processing such received signal down to the IF frequency. The received signal can then be defined by the following expression.

$$e_{IF} = \pm PN \cos(\omega_0 t + \theta) \qquad \text{(Exp. 1)}$$

where $\pm PN$ is the PRS modulated by one data bit which is either $+1$ or $-1$ and the expression $\cos(\omega_0 t + \theta)$ is the intermediate carrier frequency portion of the signal at that point in the system.

The signal of Exp. 1 is supplied to one input of mixer 102, while the other input, which receives the locally generated PRS signal, is assumed to have the same pattern as the received PRS signal.

The function of mixer 102 is to strip off the PRS signal from the received IF signal. Next, to remove the unwanted frequency components, the output of mixer 102 is passed through bandpass filter 104 and subsequently squared in squaring circuit 106 to eliminate the negative component of the received signal. This provides a doubled frequency signal defined by the following expression:

$$\cos(2\omega_0 t + 2\theta) \qquad \text{(Exp. 2)}$$

The signal of Exp. 2 is then supplied to one input of phase detector 110 of phase locked loop (PLL) system 111, the output of phase detector 110 being supplied through low pass filter 112 and then to the frequency control input 113 of VCO 114. To complete the loop the output of VCO 114 is supplied back to the other input of phase detector 110. The function of the PLL circuit 111 is to provide a filter, i.e., to generate an output signal from VCO 114 having a very narrow bandwidth. To obtain the original frequency, the output of VCO 114 is divided by 2 in frequency divider 116 and then supplied to one input of a second mixer 118, the other input thereof receiving the IF input signal (Exp. 1) from source 101.

It should be noted that the portion of FIG. 2 just described, which is the logic just above the dashed line 99, is essentially a frequency locking circuit to produce the frequency supplied to the input of mixer 118 from divider 116. The logic below the dotted line 99 is the sequence locking logic and, as will be seen later, provides chip clock pulses on output lead 144 and bit clock pulses on output lead 146.

The function of mixer 118 is to strip the intermediate carrier frequency $\cos(\omega_0 t + \theta)$ from the supplied signal (Exp. 1), leaving only the received baseband PRS signal plus some undesired frequencies which are removed by low pass filter 120. Such baseband PRS signal is then supplied to one input of mixer 122, with the locally generated PRS signal being supplied to the other input of mixer 122. It should be noted that the locally generated PRS signal supplied to mixer 122 is the same as the locally generated PRS signal supplied to mixer 102.

As discussed earlier the received PRS signal can be either an uninverted PRS signal or an inverted PRS signal representing respectively a binary 1 or a binary 0. Accordingly, when mixed in mixer 122 with the non-inverted locally generated PRS signal a non-inverted received PRS signal will result in a high-level output signal from mixer 122, and a received inverted PRS signal will result in a low level signal supplied from mixer 122 when mixed with the non-inverted locally generated PRS signal. Thus mixer 122 outputs a series of high and low level signals each having a time duration equal to the time duration of the received PRS signals and representing the bits which were represented by the non-inverted and the inverted PRS signals.

Such two-level signal is then supplied to low pass filter 124 to remove undesired higher frequencies and is then supplied to a pulse converter 126 which generates a pulse at every transition from 1 to 0 or 0 to 1. The transition pulses are designated generally by the reference character 127 in the small timing waveform 129 of FIG. 2. These transition pulses 127 are supplied to one input of phase detector 130, the other input of which receives the output of divide-by-Y circuit 140 which is a portion of a PLL system 131. Another component of PLL system 131 is low pass filter 132 which filters the output of phase detector 130 and supplies a frequency control signal to the frequency control 133 input of VCO 134. The output of VCO 134 is supplied through divider 140 which divides the output frequency thereof by Y and supplies such divided down signal frequency to the other input of phase detector 130. Thus, the output of VCO 134 has a frequency equal to the chip rate frequency and is, in fact, the chip clock pulse train indicated on output lead 144. Such chip rate clock pulses are supplied to PRS generator 136 which generates the locally generated PRS signal supplied to both mixers 102 and 122. The purpose of the PLL arrangement 131 is to deliver a steady stream of bit and chip pulses since the original input stream 127 is erratic (a pulse occurs only on a transition).

Since Y is the number of chips in a bit the output of the divide-by-Y circuit 140 is at the bit rate and is supplied through delay means 142 back to sampling logic 128 which functions to sample the output of low pass filter 124 at every transition of the output from delay 142. It will be recalled that the output of low pass filter 124 is a two level signal representing the binary 1's and 0's received by the system. Such sampling is required since the transmission of two or more adjacent 1's or two or more adjacent 0's at the output of low pass filter 124 are at the same level and difficult to identify. By means of delay circuit 142 and sampling means 128 the nature of each received bit is definitively identified and supplied to a data output lead 137 for use by some appropriate utilization means, not shown.

It is important to note that the chip clock pulses and the bit clock pulses appearing on output terminals 144 and 146 of FIG. 2 are employed in the invention to correct the phase of the chip and bit clock pulses of the signals being transmitted from the particular SES being considered.

Figure 3:
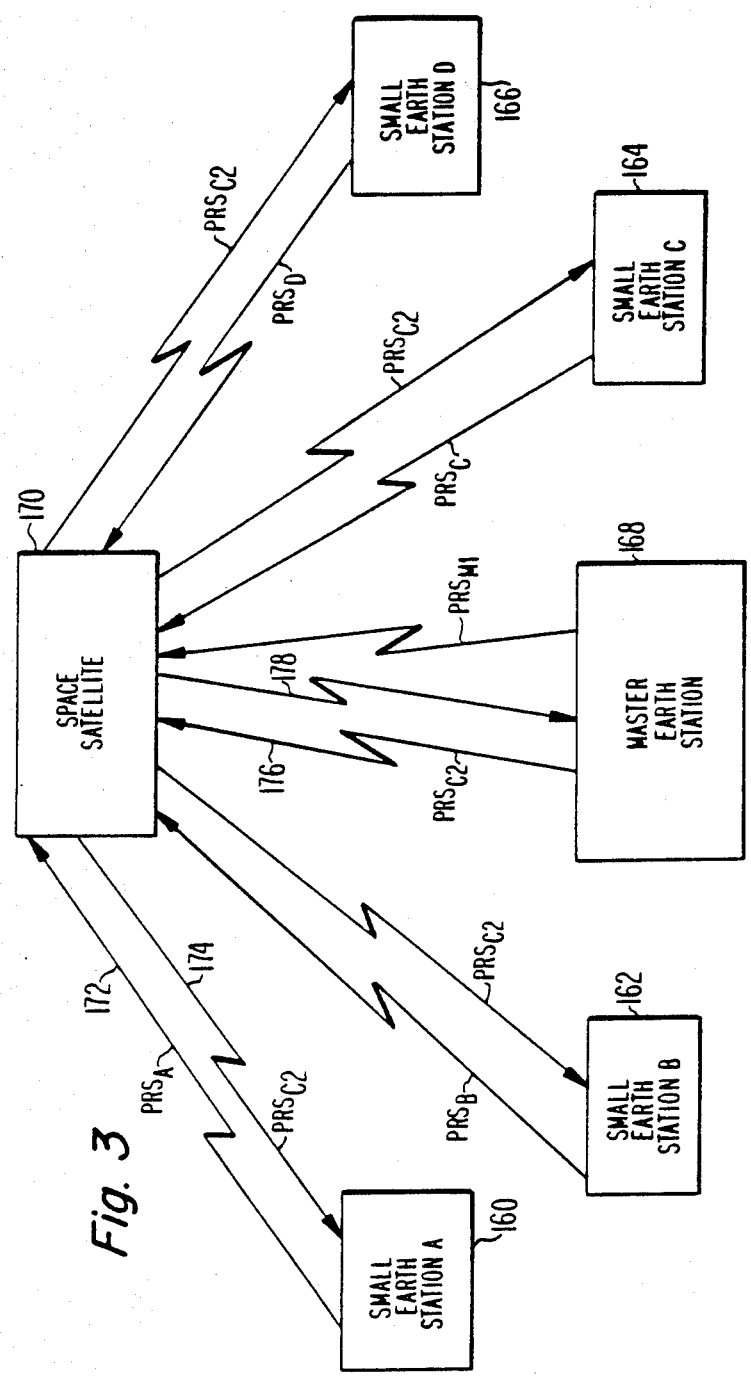
FIG. 3 is a broad block diagram of the overall system.

Reference is now made to the diagram of FIG. 3 which shows in broad block diagram form the overall basic concept of the invention. In FIG. 3 there is shown four SESs 160, 162, 164 and 166, a single MES, and a space satellite 170. Each of the four SESs transmits a pseudo-random sequence (PRS) unique thereto to the space satellite 170 from whence it is retransmitted and then received by the MES 168.

It will be noted that a transmission from one SES to another SES via the satellite and the MES is done in two hops. During the second hop an additional PRS signal is superimposed upon the PRS signal of the first hop so that the combined PRS signal spreads the data signal over a wider bandwidth which gives increased protection against narrowband terrestrial interference.

As an example of the overall operation of the system, the SES 160 transmits a signal encoded with a PRS signal $PRS_A$ to space satellite 170, as indicated by the arrow 172. The remaining SESs 162, 164 and 166 each transmits a similar PRS signal, $PRS_B$, $PRS_C$, and $PRS_D$, unique thereto, to the space satellite 170. In addition, the MES 168 transmits a first hop signal by the use of $PRS_{M1}$.

As will be discussed in detail later, the system is synchronized so that all of these PRS signals will arrive at the space satellite 170 simultaneously and are then retransmitted to the MES 168 in synchronism as a composite signal $PRS_{C1}$ at a carrier frequency bandwidth #1. The MES 168 superimposes an additional higher chip rate PRS signal $PRS_{M2}$ on the received composite signal $PRS_{C1}$ and retransmits the signal at a different carrier frequency (bandwidth #2) as $PRS_{C2}$. The encoding of the $PRS_{C1}$ signal received by MES 168 with an additional PRS signal $PRS_{M2}$ of a higher chip rate broadens the frequency bandwidth of the second hop signal being retransmitted from MES, which in turn increases the spread spectrum processing gain at the receiving SES. Narrowband interferences (for example, from terrestrial sources) are reduced by this processing gain.

The $PRS_{C2}$ signal can be retransmitted with higher power than could be achieved in a single hop system because of the amplification of the signal being provided by the MES 168 which could not be provided by the space satellite 170 due to the limited capability thereof.

The $PRS_{M1}$ signal is used for three purposes: a reference for bit and chip clocks, a distributor of system status information so that on line SESs know when another SES turns on its equipment, and for initial acquisition of synchronization when any SES first joins the system.

The transmissions from each of the SESs contain pause periods which are timed to arrive simultaneously at the MES. There is thus available a common pause period during the retransmission of the composite signal from the MES. It is during these common pause periods that phase error correction commands (ECCs) are inserted and addressed to those SESs whose bit, chip, or pause period timing needs correction.

Thus, each of the SESs receives $PRS_{C2}$ after it is retransmitted by space satellite 170 with all of the PRS components thereof being in synchronism and with the ECC pause periods of all of the PRS signals being received in synchronism. Each SES then functions to strip the received $PRS_{C2}$ signal of the $PRS_{M2}$ encoding by multiplying the received signal by a locally generated $PRS_{M2}$ signal. The remaining signal will then contain the $PRS_{C1}$ component which, at the proper receiving SES, is multiplied by the PRS signal of the transmitting SES to reconstitute the two-level data bit signal generated at the transmitting station.

It is to be noted that in this particular embodiment of the invention, the protocol is limited so that communication can occur between two SESs only. Thus, SES 160 might communicate only with SES 164 and vice versa, and SES 162 might communicate only with SES 166. Accordingly, SES 160 must contain a means for generating the $PRS_C$ signal transmitted by SES 164 in order to despread the incoming signal $PRS_{C1}$ and thereby determine the bit train represented by the $PRS_C$ component of the $PRS_{C1}$ signal. This will be discussed in more detail later.

It is an important feature of the invention that all of the pause periods in the first hops (i.e. from the SESs to the MES) are synchronized as they arrive at the MES to provide for the common pause periods in the second hop from the MES to the SESs. This synchronization of the pause periods allows the insertion of commands within the pause period without spreading those commands by the PRS of the transmitting SES, as explained in detail below in connection with Expression 3. Consequently, it is not necessary to demodulate the first hop composite signal, nor is it necessary to separate it into the individual PRS signals. Thus it is not necessary to have individual transmitters at the MES to transmit each PRS signal. A single transmitter for the composite signal is sufficient. The foregoing is one of the advantages of the present invention, e.g., the system requires less transmitters at the MES than prior art systems. Since the signal is reprocessed at the MES and the gain of the MES is large, most of the noise acquired during the first hop is not carried over into the second hop.

All the SES PRSs are received as a single, composite signal although chip and bit clock pulses of each SES PRS are extracted therefrom at the MES and employed to check bit and chip synchronism of each SES PRS.

The received composite signal, after being further spread in frequency by a PRS signal $PRS_{M2}$ having a higher chip rate than that of the SES PRS, is retransmitted as a composite signal to all of the SESs via satellite 170.

The intermediate frequency (IF) signal received by an SES can be defined by the following expression:

$$e_{IF} = PRS_{M2} \cdot CM \cdot \Sigma PRS_J \cdot DT_J \cdot \cos(w_o t + \theta_j) \quad \text{(Exp. 3)}$$

where $DT_J =>$ data bit value, $\pm 1$, of the Jth transmitting SES;
$PRS_J =>$ PRS chip value, $\pm 1$, of the Jth transmitting SES;
$PRS_{M2} =>$ PRS chip value, $\pm 1$, of the MES for the second hop;
$CM =>$ ECC command bit value during pause periods, $\pm 1$, or idle signal $+1$ during rest of the time;
$w_o =>$ carrier frequency; and
$\theta_J =>$ relative phase shift of the Jth SES.

The summation over J in Exp. 3 yields the signal $PRS_{C1}$ in FIG. 3. Outside the pause periods CM has no effect. That is to say a steady idle signal of continuous +1's produces no phase shifts in carrier modulation by phase shift keying. Consequently, outside the pause periods a despreading by $PRS_{M2}$ and $PRS_K$ yields $DT_K$ because $PRS_{M2} \cdot PRS_{M2} = 1$ and $PRS_K \cdot PRS_J = 0$ if $J \neq K$ and the signal is integrated over the duration of a data bit.

During the pause periods $DT_J = 1$ for all J, and despreading by $PRS_{M2}$ and $PRS_K$ yields CM, for all K. Therefore, every SES receives all ECC signals, and the commands need addresses so that each SES can identify the command meant for it.

Synchronization is obtained and maintained generally in the following manner. Assume a transmitted data bit rate of 9500 bits per second. At each SES the bits are entered into a buffer (typically a FIFO) from a data source at an average rate of 9500 bits per second and then extracted from the buffer in groups of 9500 bits with a first pause period having a duration of 100 bit periods added at the end of each group of 9500 bits so that the transmitted bit rate of the data plus the pause idle signal is, in fact, 9600 bits per second.

It is in this 100 bit pause period (as retransmitted from the MES as a common pause period) that the MES inserts an ECC signal which will be received by the proper SES and enable acquisition and maintenance of chip, bit, and pause period synchronization.

The determination that the signal transmissions from one of the SESs is drifting out of sync is determined at MES 168 (FIG. 3) by a comparison of the SES PRS with $PRS_{M1}$ which, during proper operation, should be in phase synchronization at the MES with all of the PRS signals generated by the SESs.

Once MES 168 has determined that the chip rate of a given SES is drifting out of sync, then MES 168 will determine the amount and direction of correction required and will develop an ECC signal to correct such error. MES 168 will store such ECC signal until the common pause period occurs at the MES. When such common pause period occurs, MES 168 will insert therein the ECC signal for correcting the phase of the PRS signal of the failing SES, which will be assumed to be SES 160. Such ECC signal will then be transmitted via satellite 170 to SES 160 during the common pause period.

SES 160 will receive such ECC signal and make a correction in the phase of its generated PRS signal. MES 168 will have made a record of the time it transmitted the ECC signal to SES 160. After a sufficient amount of time has elapsed, which will be on the order of 0.8 seconds to allow for the transit time of the ECC signal to SES 160 via satellite 170 and then to return via satellite to the MES, the MES 168 will again check the phase of the PRS signal $PRS_A$ generated by SES 160. If the phase error is still outside predetermined limits, as will be discussed in connection with the flow charts of FIGS. 11 and 12, MES 168 will compute and prepare another ECC signal which will be transmitted via satellite 170 back to SES 160 during a subsequent common pause period, as discussed above. The foregoing process is continuously carried out to maintain the phase synchronization of SES 160 within predetermined limits.

In a similar manner, chip phase synchronization of SES 164 is maintained within predetermined limits by computing the phase error of $PRS_C$ relative to $PRS_{M1}$ in the logic of MES 168 and then an error correction signal inserted during the first common pause period of the transmission from SES 160 to SES 164. A similar technique of acquiring and maintaining phase synchronization of the pair of communicating SESs 162 and 166 is employed in the system.

Figure 4:
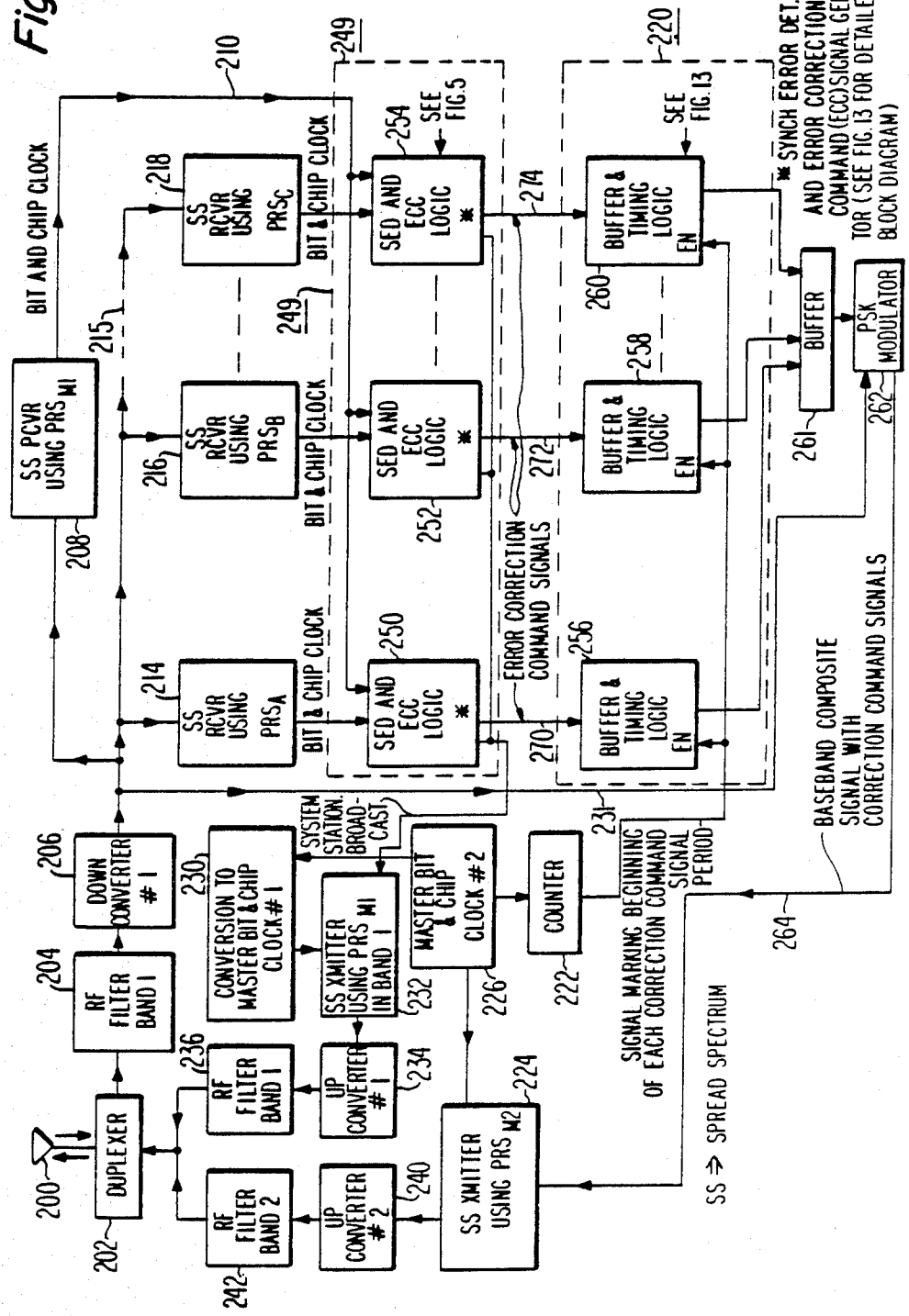
FIG. 4 is a general block diagram of the MES of the present invention.

Referring now to FIG. 4, there is shown a block diagram of MES 168 of FIG. 3. The MES includes a plurality of receivers each designed to receive and detect the PRS signal generated by one of the SESs. More specifically, the receivers 214, 216, and 218 each receive and detect the PRS signal of one of the SESs as, for example, the SESs 160, 162, and 164, respectively, of FIG. 3. The MES of FIG. 4 also includes another receiver 208 which is employed to detect the master PRS signal $PRS_{M1}$ originating at the MES of FIG. 4 by transmitter 232, as will be discussed later.

The PRS signals originating at the SESs are first received by the space satellite 170, then retransmitted from the satellite as a composite signal with chip, bit, and common pause period synchronization, and finally received (as the composite signal) by the MES of FIG. 4 via antenna 200 and duplexer 202. This composite signal is then supplied through signal processing components including RF filter 204, down-converter 206, and then supplied to receivers 214, 216 and 218 via common bus 215.

Each of these received PRS signals is examined in receivers 214, 216 and 218 but only for their bit and chip clock signals. The received composite signal, including the data, is also supplied directly from down-converter 206 to transmitter 224 via logic 262 where the ECC signals generated by sync error detector and error correction command signal generator logic 250, 252, and 254, identified generally herein as SEDECC logic 249 to be discussed later herein, modulate the composite signal during the common pause period. In transmitter 224, the baseband composite signal with the ECC signals now added therein is spread spectrum modulated over a new bandwidth using $PRS_{M2}$ which has a higher chip rate than $PRS_{M1}$. The output of transmitter 224 is supplied to up-converter 240 where it is up-converted to a frequency of bandwidth designated as bandwidth #2.

The output of up-converter 240 is supplied to RF filter 242 whose output is combined with the output of RF filter 236. The combined signal is then supplied through duplexer 202 to antenna 200 from whence it is transmitted to space satellite 170.

It is to be specifically noted that the output of transmitter 224 is a composite signal containing the PRSs of all the SESs and is represented by $PRS_{C2}$ of FIG. 3. $PRS_{M1}$ is generated by logic including master bit and chip clock source 226, conversion logic 230, and transmitter 232. The master bit and chip clock source 226 also supplies clock pulses which are employed in the second hop from MES transmitter 224 to the SESs.

To generate PRS$_{M1}$ the output of master bit and chip clock 226 is supplied to the conversion-to-master bit and chip logic 230 where it is converted to the same bit and chip clock rate employed in the first hops from the SESs to the MES of FIG. 4. Transmitter 232 utilizes the master bit and chip clock output from logic 200 to generate PRS$_{M1}$ in bandwidth #1 of the first hop and to supply such signal to up-converter 234. The output of up-converter 234 is supplied to RF filter 236, and thence (combined with the output of RF filter 242) through duplexer 202 to be transmitted from antenna 200 to the space satellite 170 of FIG. 3. Such PRS$_{M1}$ signal is then retransmitted from satellite 170 back to the MES of FIG. 4 where it passes through duplexer 202, RF filter 204, down-converter 206 and into receiver 208 which derives the bit and chip clock pulses of PRS$_{M1}$ therefrom. Such bit and chip clock pulses are supplied via lead 210 to an input of the SEDECC signal logic 249 which also receives chip and bit information derived from the SES PRSs by receivers 214, 216, and 218.

The SEDECC logic 249 compares the bit and chip clock pulses from each of the receivers 214, 216, and 218 with PRS$_{M1}$ bit and chip clock pulses supplied from receiver 208.

As a result of each of such comparisons of bit and chip clock pulses, there appears at output leads 270, 272, and 274 of SEDECC logic 249 ECC signals which indicate the phase error correction needed for each of the SESs, such as SESs 160, 162, 164 and 166 of FIG. 3. Such ECC signals, are supplied to buffer and router timing logic 220 (shown in detail in FIG. 13 to be described later herein). From there they pass to another buffer 261 which arranges the ECC signals in FIFO order. Assume that the pause period is 100 bits in length and that the ECC signal is 20 bits in length. Then five ECC signals can be transmitted during one pause interval. The ECC signals are superimposed upon the composite signal by PSK modulation in 262, as given by Exp. 3, during the common pause interval. The resulting composite signal (plus ECC signals) is supplied to the input of transmitter 224.

Figure 5:
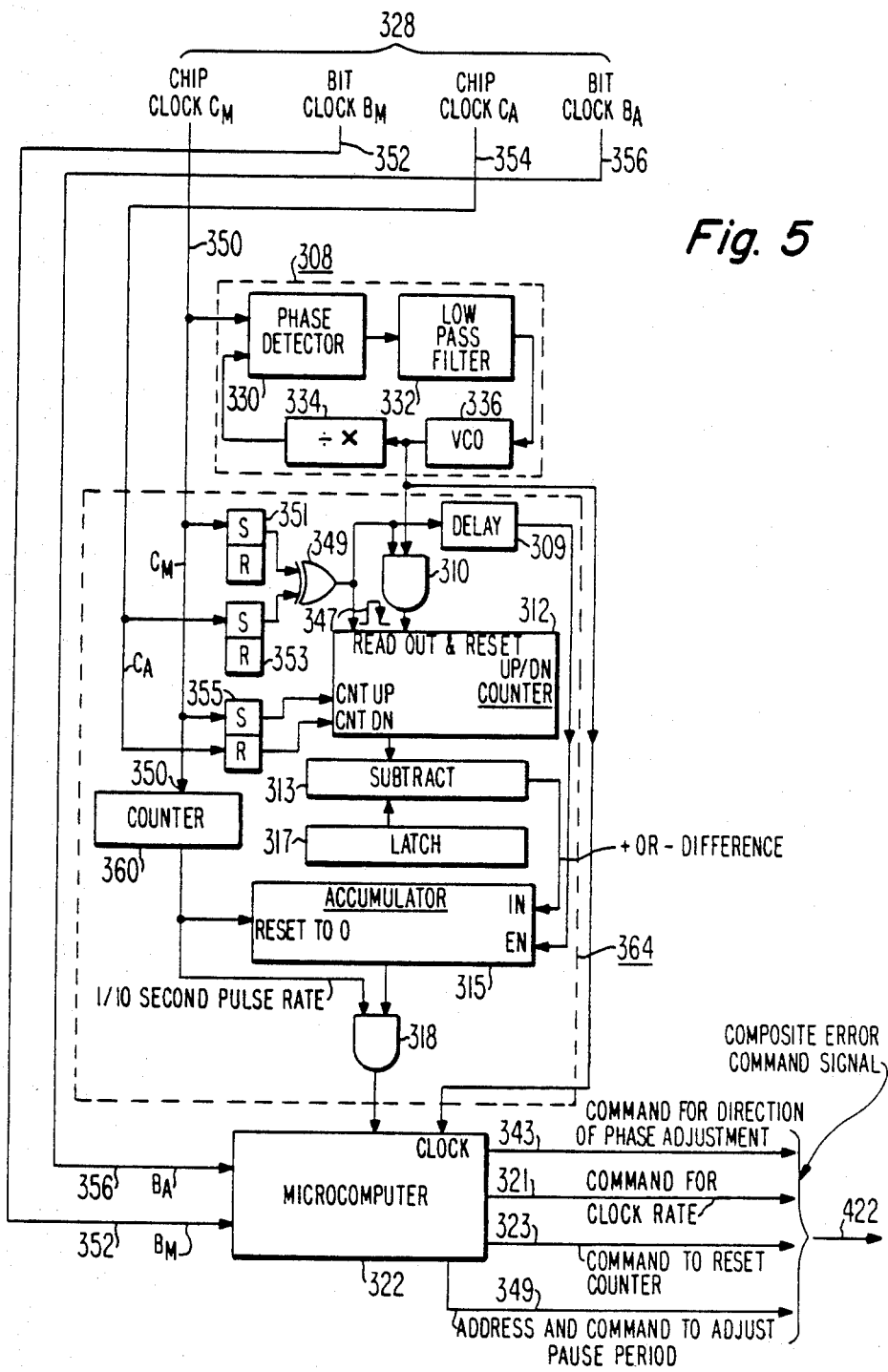
FIG. 5 is an expanded combination block and logic diagram of one of the synchronization error detection logic arrangements within block 249 of FIG. 4.

Reference is now made to FIG. 5 (corresponding to SEDECC 249 of FIG. 4) which shows the detailed logic required at the MES of FIG. 4 to compare the bit and chip clock pulses derived from the received composite signals by one of the receivers 214, 216, or 218 with the master bit and chip clock pulses (B$_M$ and C$_M$) derived by the receiver 242 of FIG. 4. It is to be understood that one set of the logic shown in FIG. 5 is required for each of the received signals from each of the SESs. Thus, if there are N SESs, then there must be N logic arrangements as shown in FIG. 5, all of which are included within the SEDECC 249 of FIG. 4.

Figure 7:
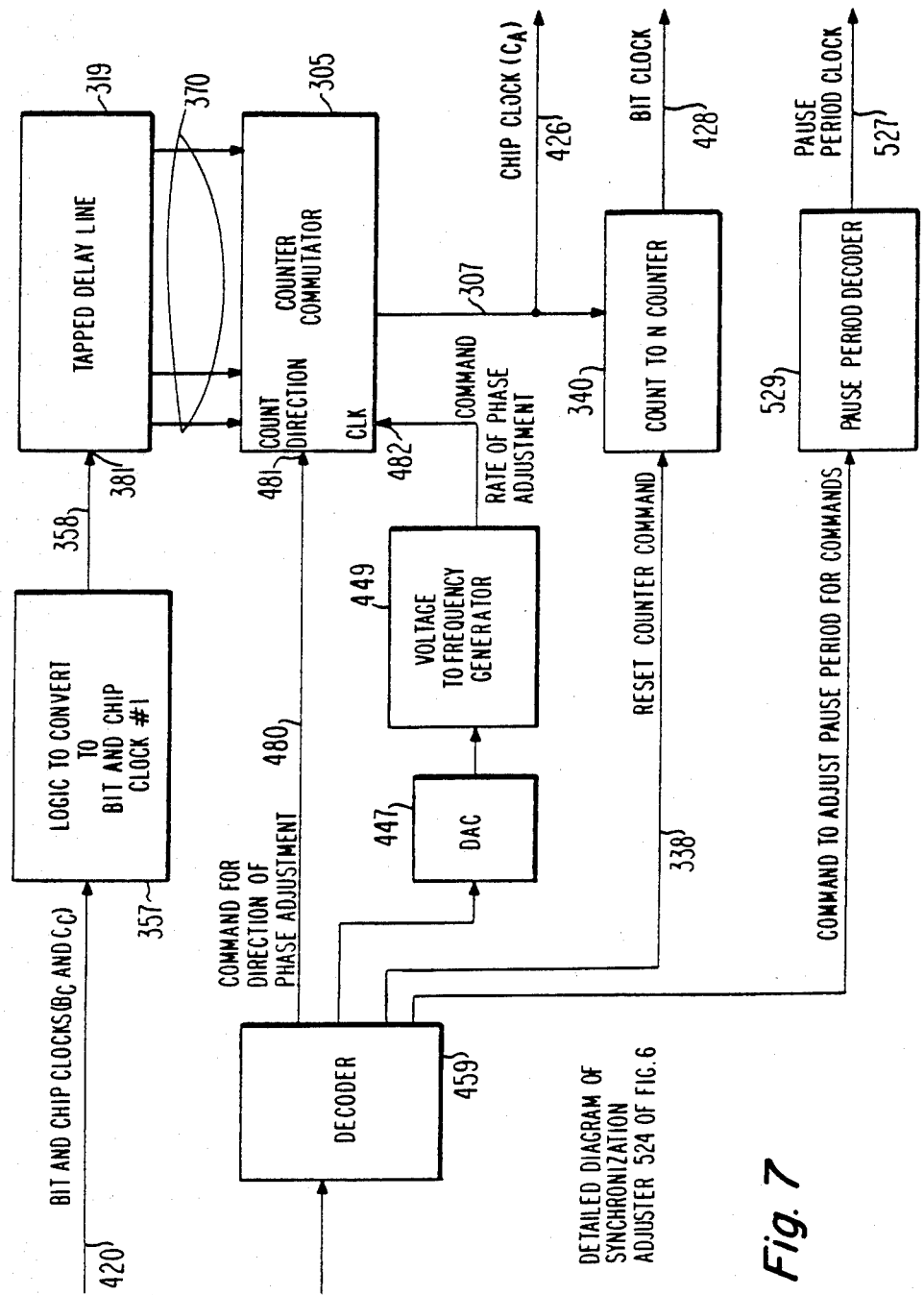
FIG. 7 is an expanded block diagram of the synchronization adjuster 524 of FIG. 6.

The ECC signals appearing on each of the output leads 270, 272, and 274 of FIG. 4 include a command component for the direction of adjustment of the phase, as indicated by the output of output lead 343 of microcomputer 322 of FIG. 5, a command component on lead 321 to reset the speed of counting of a variable counter (commutator) 305 located at the receiver (FIG. 7) which determines the rate at which the synchronization correction is to take place, a reset counter command on lead 323 to reset counter 340 of FIG. 7 to obtain bit synchronization, and a pause period command on lead 449 to control the timing of the pause period.

Assume that the logic of FIG. 4 is that logic employed to compare the bit and chip clocks pulse rates derived from PRS$_A$ by receiver 214 of FIG. 4 and the master bit and chip clock pulse rates derived from PRS$_{M1}$ by receiver 208 of FIG. 4.

In FIG. 5, the four inputs 328 correspond to the bit and chip clock pulses appearing at the outputs 207 and 210 of receivers 214 and 208 of FIG. 4. As discussed above, the purpose of the logic of FIG. 5 is to compute the phase error of the PRS signal of a given SES which, in the current example being discussed, has been selected to be SES 160 of FIG. 3 (corresponding to receiver 214 of FIG. 4).

Figure 6:
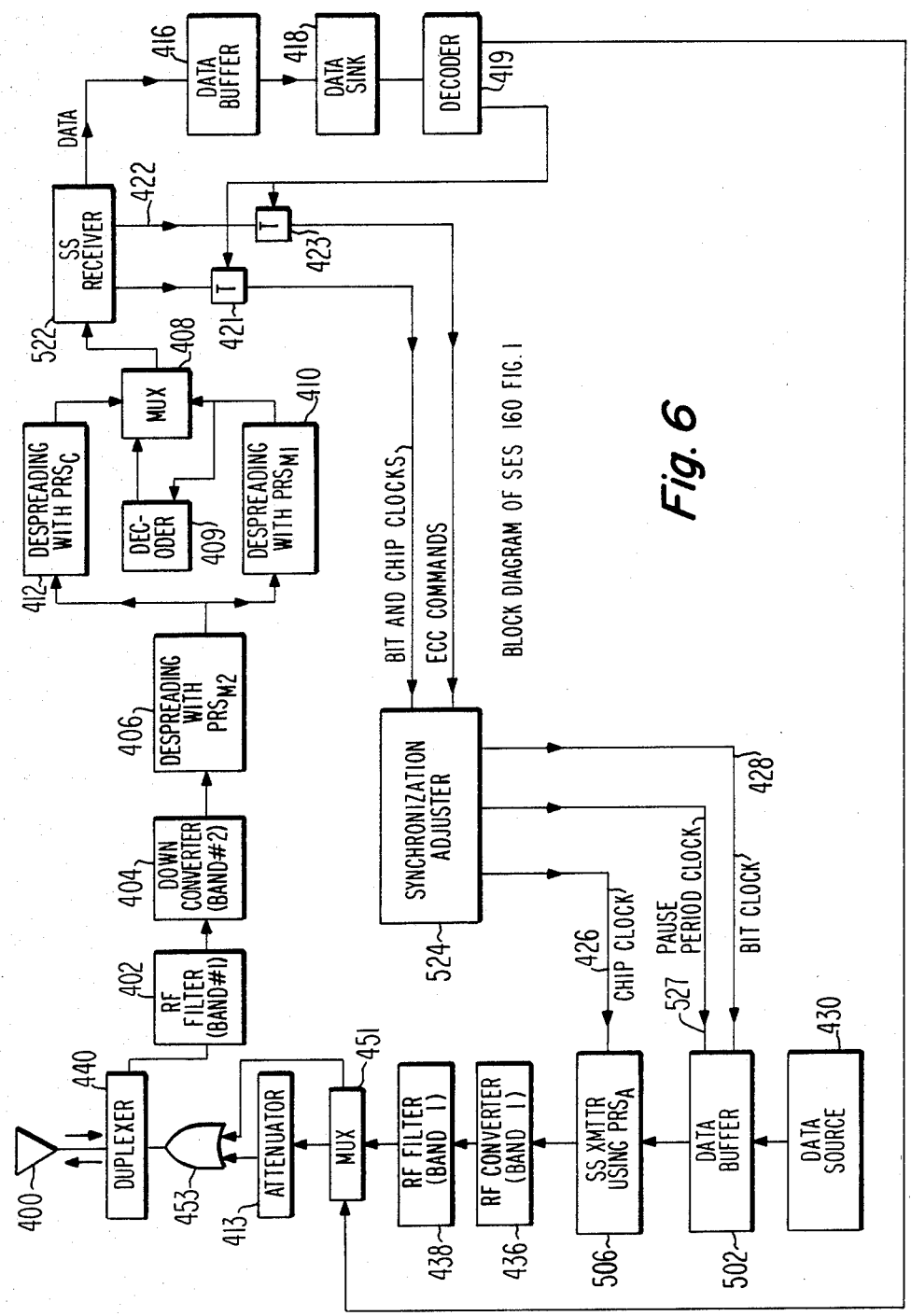
FIG. 6 is a block diagram of an SES.

An ECC signal is generated in microcomputer 322 of FIG. 5 which will be received by receiver 160 of FIG. 3, is shown in more detail in FIG. 6. More particularly, such ECC signal, after modulation and despreading by multiplying by PRS$_{M2}$, will be supplied to synchronization adjuster 424 of the SES of FIG. 6, shown in more detail in FIG. 7, during the common pause period of the second hop to effect a corrective change in the phase of PRS$_A$ of the SES of FIG. 6.

Thus, logic must be provided to store the computed ECC signal required to be transmitted back to SES 160 until the next common pause period occurs. Further logic must be provided to insert the stored ECC signal in the common pause period so that it will be transmitted back to SES 160 (FIG. 3) and decoded by the synchronization adjuster of SES 160, shown as logic 324 of FIG. 6.

Figure 13:
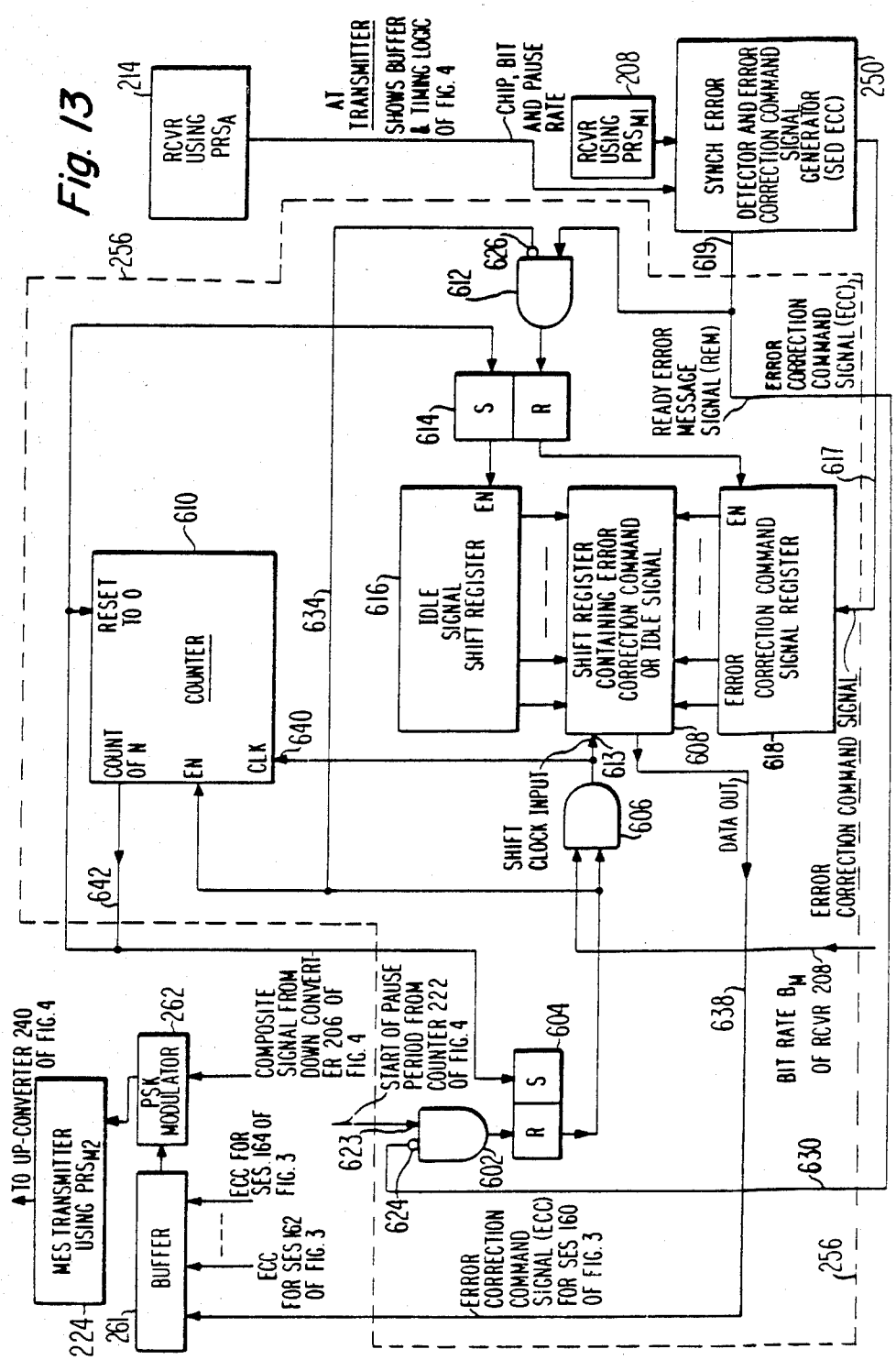
FIG. 13 is a combination block and logic diagram of the ECC buffer timing logic 220 of FIG. 4.
Figure 14:
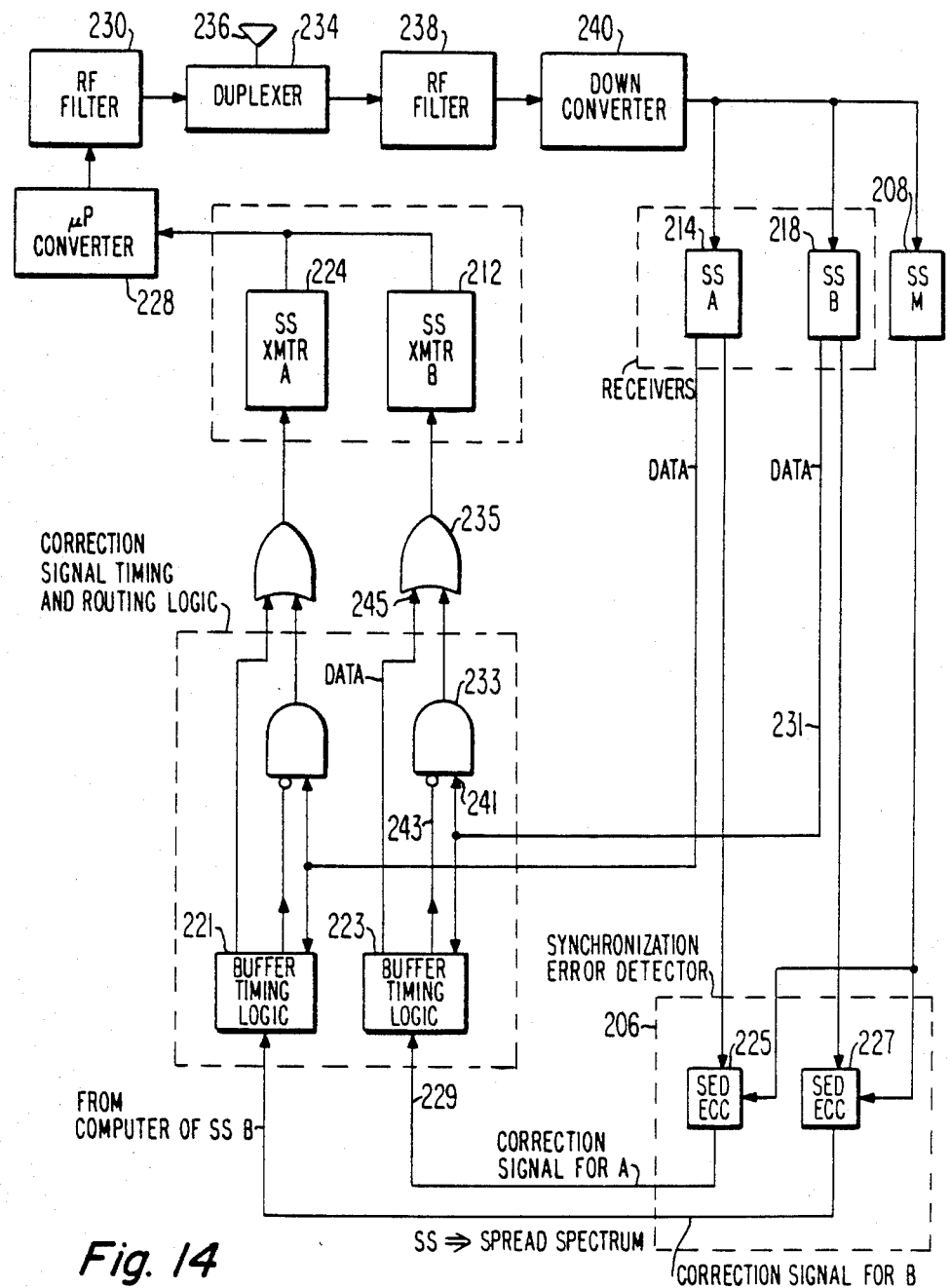
FIG. 14 is a combination block and logic diagram showing the overall plan of the routing of the ECC signals at the MES.

The logic for storing the computed ECC signal for SES 160 and for transmitting it back to SES 160 during the common pause period of the second hop is shown in FIG. 13. In FIG. 13 assume that the transmission from small station 160 (FIG. 3) is received by the receiver 214 (FIG. 4) of the MES. The logic within block 250 of FIG. 13, which detects the sync error and generates the ECC signal, compares the bit and the chip rate of the transmission from SES 160 with the PRS$_{M1}$ signal received back from the satellite, detects the phase difference between the two PRS signals, and then generates an ECC signal which is supplied to the ECC signal register 618 of FIG. 13 via bus 617. Detection of the phase error and the generation of the ECC signal can occur at any time including a common pause period. However, the system must wait until the next pause period occurs after an ECC signal has been stored in register 618 (FIG. 13) before such ECC signal can be inserted into such next pause period and retransmitted from the MES to SES 160 of FIG. 3 via satellite 170 (FIG. 3). Furthermore, the pause period can accommodate only a certain finite number of ECC signals which can be arranged in FIFO order in buffer 261. If the number of ECC signals exceeds the number which can be inserted within a pause period then some ECC signals will have to be postponed until the next pause period.

Immediately after the ECC signal is stored in signal register 618 (FIG. 13) a ready error message (REM) signal is supplied from SEDECC logic 250 to input 624 of AND gate 602 via lead 630, thus preparing the system to insert the ECC signal when the next common pause period occurs.

The start of the common pause period signal, generated by the output of counter 222 of FIG. 4, is supplied to the input 623 of AND gate 602 to enable AND gate 602 (assuming that input 624 has a high level signal thereon) and thereby reset flip-flop 604, which in turn will prime AND gate 606. The priming of AND gate 606 will enable the bit clock pulses $B_M$ of receiver 208 to pass therethrough and to the shift input 613 of shift register 608.

It will be noted that the REM signal appearing on output 619 of the SEDECC signal generator 250 is supplied to one input of AND gate 612, thus priming AND gate 612 so that immediately after the ECC signal is completely entered into enabled ECC signal register 618 it will be transferred to shift register 608. Such shifting of the ECC signal can only occur outside the common pause period since the reset output of flip-flop 604 is connected to the inhibit input 626 of AND gate 612 via lead 634. Thus, when a common pause period begins and flip-flop 604 is reset AND gate 612 is inhibited and no transfer of the ECC signal from register 618 to shift register 608 can occur during such pause period. Such transfer must occur after the common pause period.

Assuming however that the transfer of the ECC signal from register 618 to register 608 has occurred, such ECC signal will be shifted out of shift register 608 during the common pause period in response to bit clock pulses $B_M$ passing through AND gate 606 and to the shift clock input 613 of register 608.

It is predetermined that the ECC will consist of N number of bits which, in the example being discussed, can be 20 bits. The output of AND gate 606 is supplied to the clock input 640 of count-to-N counter 610. Thus, when counter 610 counts to N it will output a signal on lead 642 which will perform three functions. It will set flip-flop 604 to disable AND gate 606 and thereby prevent further bit clock pulses from being supplied to shift register 608. Secondly, it will set flip-flop 614 to enable idle signal shift register 616. The idle signal shift register 616 contains a predetermined idle signal which can consist of N consecutive binary 1's (preceded by a sequence of alternate 1's and 0's), for example.

If the transmission from SES 160 (FIG. 3) needs no correction, the idle signal, which has now been shifted into shift register 608, will be transmitted as the contribution from the MES during the pause period. Such idle signal in the common pause period will continue during each successive common pause period until another phase error is detected in the transmission from SES 160, at which time an ECC will be generated by SEDECC logic 250 and supplied to signal register 618 and then to shift register 608 where it will be entered into the common pause period of the composite signal being transmitted from the MES of FIG. 13.

It is to be specifically noted that at the count of N of counter 610 the counter 610 is reset to zero in preparation for the occurrence of the next common pause period. Further, the contents of the idle signal register 616 are shifted into the shift register 608 at the count of zero of counter 610 so that the idle command signal will be transmitted during the next common pause period unless a sync error is detected by logic 250.

Also, as shown in FIG. 4, the output of all the buffer and timing logic components 220 of the system, such as the one shown in detail within the dotted block 256 of FIG. 13, are supplied to PSK modulator 262 of FIG. 4 along with the composite signal from down-converter 206 of FIG. 4. Modulator 262 superimposes the ECC signals upon the composite signal by PSK modulation. The output of modulator 262 is supplied to the MES transmitter 224 where it is modulated with the $PRS_{M2}$ signal which has a higher chip rate than appearing at the output of receiver 214, for example. Consequently, to generate the second-hop signal PSK modulation is employed twice: first in logic 262 at the bit rate $B_M$, and then in transmitter 224 at the $PRS_{M2}$ chip rate.

As shown in FIG. 4 the output of MES transmitter 224 is up-converted and supplied to RF filter 242, combined with the output of filter 236, and then supplied through duplexer 202 to the transmitting antenna 200. Antenna 200 transmits the signal to the satellite 170 of FIG. 3.

Such signal is retransmitted from satellite 170 to all of the SESs including the one shown in FIG. 6. The signal is received via antenna 400 (FIG. 6) and duplexer 440 and then, as described briefly above, supplied in tandem to RF filter 402, down-converter 404, and despreader 406. It will be noted that the logic of elements 402 and 404 process the signal from frequency band #2. Despreader 406 removes the PRS signal $PRS_{M2}$ from the base band composite signal before it is supplied to either despreader 412 or despreader 410 in accordance with the setting of switch 408 which is controlled either manually or by system status signals using $PRS_{M1}$ and decoded by despreader 410 and decoder 409.

As will be discussed later, despreader 410 multiplies the signal with $PRS_{M1}$, thereby leaving any system status message that was generated at the MES using $PRS_{M1}$ during the data transmission periods, while during the pause periods the same operation yields ECC signals.

It should be understood that during start up and before sync is acquired, and further if only one SES of a given pair of SESs is coming on line and the other SES of such pair is not on line, commands are supplied to the SES coming on line using $PRS_{M1}$, as will be discussed in detail later herein.

For purposes of the present discussion assume that station 164 (FIG. 3) is transmitting in the normal operating mode to station 160, shown in detail in FIG. 6, and that switch 408 connects to despreader 412 to receiver 522, with despreader 410 being disconnected. Under these conditions it is assumed that chip, bit, and pause sync have been obtained. Receiver 522 will extract the bit and chip clock signals of PRS 164 from the signal supplied thereto from despreader 412 and supply such extracted bit and chip clock timing signals to synchronization adjuster 524. The start of the pause period, which is identified by the pause clock signal, is also extracted from the output of despreader 412 by receiver 522 and supplied to sync adjuster logic 524.

If the phase relation of $PRS_{M1}$ to $PRS_A$ at the MES of FIG. 4 is within a certain predetermined distance then the ECC signal supplied to sync adjuster 524 will call for no change in the chip, bit, and pause phase of the signal transmission generated at transmitter 506 of FIG. 6. However, if the phase difference of $PRS_A$ is more than the predetermined distance from the phase of $PRS_{M1}$ as measured at the MES, then the ECC signal generated in SEDECC logic elements 250, 252, and 254 of FIG. 4 will have generated an ECC signal which will appear on output lead 422 of receiver 522 of FIG. 6. Synchronization adjuster 524 will respond to such ECC signals to generate new chip and bit clock pulses having a corrected phase on output leads 426 and 428 thereof. Such chip and bit clock pulses are supplied to the transmitter 506 and the data buffer 502 of FIG. 6.

It can now be seen that the MES station of FIG. 4 has a total of N+1 receivers and one transmitter and that the SESs each have one receiver and one transmitter.

Thus, the system has a total of N+1 transmitters and 2N+1 receivers, where N is the number of SESs.

A more detailed diagram of sync adjuster 524 of FIG. 6 is shown in FIG. 7 wherein the bit and chip clock inputs 420 and 422 correspond to the bit and chip input leads 420 and 422 of sync adjuster 524. The bit and chip clock pulses generated at the output of receiver 522 of FIG. 6 must first be converted to the bit and chip clock pulses of frequency band #1. This conversion is done in logic 357 of FIG. 7. It will be recalled that the chip clock rates employed in the first hops of the system (from the SESs to the MES) is different from that employed in the second hop (from the MES to the SESs) since higher rates are required to obtain a high level of signal protection against interference.

The tapped delay line 319 (FIG. 7) is essentially a wound coil which delays the received signal with a plurality of taps, such as taps 370, spaced therealong. A commutator 305 can be connected sequentially to the taps 370 at varying rates of commutation and in either direction to either continuously advance the phase of the signal supplied to the tapped delay line 319 from logic 357 or to continously retard the phase thereof. The rate of such advancing or retardation of phase represents an increase or decrease in frequency with such change in frequency being proportional to the rate of change of phase. All of the contacts of taps 370 are connected sequentially to a common output 307 of commutator 305 so that the new bit and chip rate of the SES of FIG. 6 is produced on output leads 428 and 426 of FIG. 7 and which are supplied respectively to data buffer 502 and transmitter 506 of FIG. 6.

As discussed above, the ECC signals for controlling the rate and direction of the count of counter 305 are supplied from output lead 422 of processor 322 of FIG. 5 to the input 422 of decoder 459 of FIG. 7. The direction command component of the ECC signal is supplied via lead 480 to the direction control input 481 of counter 305 and the clock pulses which determine such rate are supplied to clock input 482 of counter 305 via digital-to-analog logic 447 and voltage-to-frequency generator 449.

Figure 15:
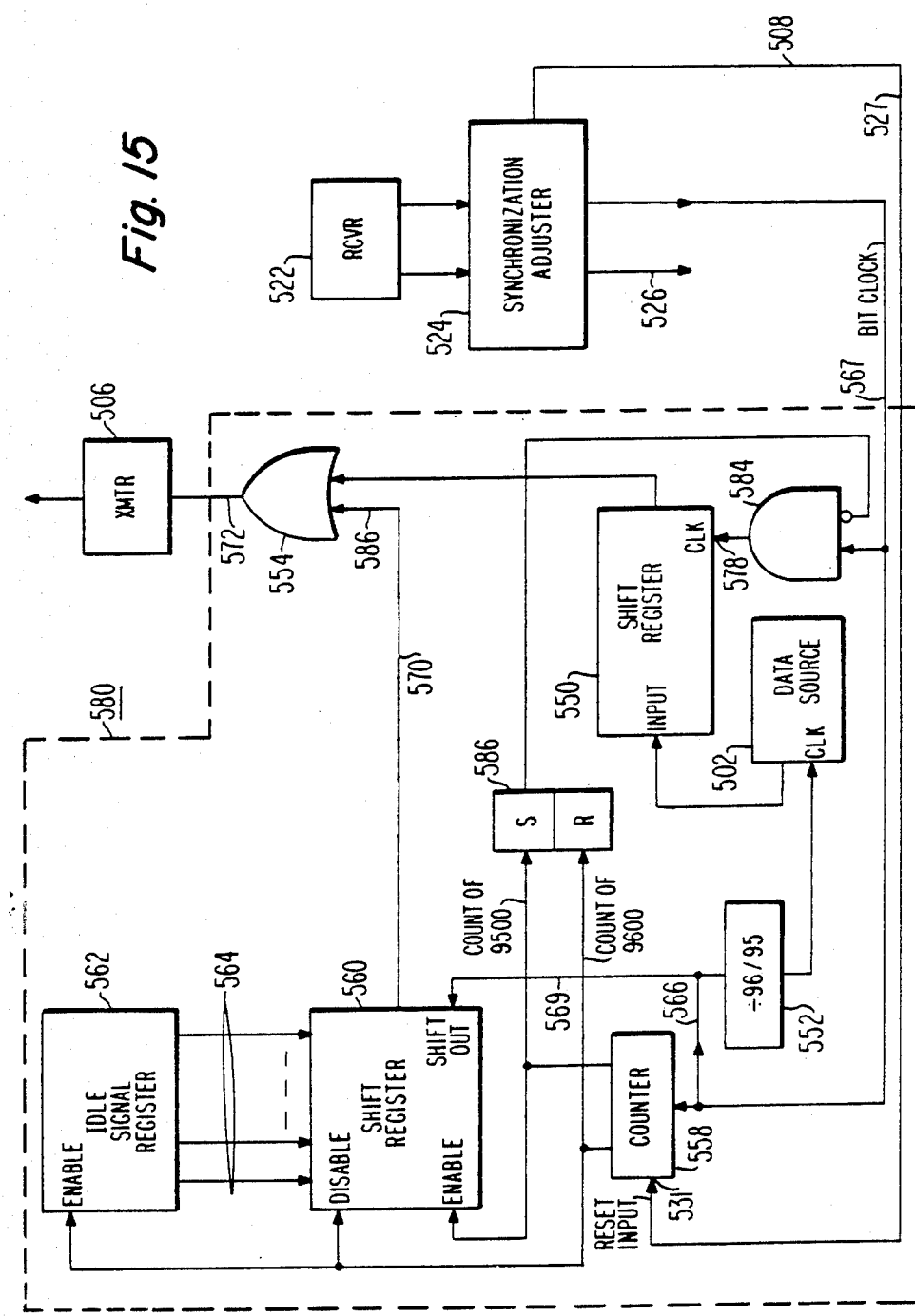
FIG. 15 is a combination block and logic diagram for inserting the command signal in the corresponding ECC time slot.

Referring now to FIG. 15 there is shown within dashed block 580 a more detailed diagram of the data buffer logic 502 of FIG. 6. Also shown in FIG. 15 is a transmitter 506, a receiver 522 and a synchronization adjuster 524 which correspond to similarly identified logic elements in FIG. 6.

In FIG. 15 the bit clock signal is supplied from synchronization adjuster 524 to one input of counter 558 via lead 567, to a divide-by-96/95 divider 552 via leads 567 and 566, and also to an input of AND gate 584. This bit clock rate is nominally 9600 bits per second so that the output of the divider unit 552 is 9500 clock pulses per second. Thus, the data is stepped out of data source 504 and into shift register 550 at a 9500 bit per second rate. The data is then shifted out of the shift register 550 at a rate of 9600 bits per second by virtue of the clock pulses supplied from sync adjuster 524 to clock input 578 thereof through AND gate 584, when enabled. AND gate 584 is enabled when flip-flop 586 is in a RESET condition, which occurs during the count of 0 to 9500 of counter 558. Flip-flop 586 becomes set at the count of 9500 of counter 558. When the count of 9600 is reached by counter 558, flip-flop 586 is reset again, thus enabling the AND gate 584 until the following count of 9500 is reached. Accordingly, shift register 550 will not clock out bits therefrom during the period between the counts of 9500 and 9600 of counter 558, which period is defined herein as the pause period (not the common pause period until it is synchronized with the common pause period at the MES) of the bit stream generated by the SES represented generally in FIG. 15. During this pause period, the contents of shift register 560 are shifted therefrom to input 586 of OR gate 554 and then to the input of transmitter 506 via lead 572.

It will be noted that when shift register 560 is enabled between the counts of 9500 and 9600 of counter 558 the bit clock signal supplied via leads 567, 566, and 569 from synchronization adjuster 524 will shift out the contents of shift register 560. The contents of shift register 560 consists of the idle signal which fills the pause period and is contained permanently in register 562. At the end of the shifting out of this idle signal from register 560, which occurs at the count of 9600 of counter 550, the idle signal register 562 is enabled to again enter the idle signal into shift register 560 in preparation for the generation of the idle signal during the next pause period of the bit stream generated by the SES of FIG. 15.

Consider now the detailed logic of FIG. 5 and FIG. 7 together. The logic of FIG. 5 determines the phase angle error of the PRS signal of each SES with the $PRS_{M1}$ signal generated by the MES but after transmission thereof to, and being received back from, the satellite. As stated above, the logic of FIG. 5 is located at the MES with duplicate logic arrangements as shown in FIG. 5 being employed for each of the SESs in the system.

In FIG. 5, the four inputs 328 correspond generally to bit and chip clock pulses appearing at the output of receivers 214 and 208 of the MES of FIG. 4. The specific purpose of FIG. 5 is as follows. The phase difference ($\Delta\phi$) between chip clock pulses $C_M$ (from the MES) and $C_A$ (from SES 160 of FIG. 3) is measured and a clock, in the form of counter 312, caused to run during the period between the occurrence of chip clock pulse $C_A$ and a subsequent chip clock pulse $C_M$ assuming chip clock pulse $C_A$ to be lagging chip clock pulse $C_M$. If $C_A$ is leading chip clock pulse $C_M$ then counter 312 is again caused to run but now to determine the amount of leading phase rather than lagging phase, as will be discussed in more detail later.

The count value of counter 312 in the MES is accumulated over a period of time as, for example 0.1 second, and then supplied to computer 322 through subtract logic 313 and accumulator 315. Computer 322 functions to interpret the total accumulated count value in counter 312 and then generate an ECC signal which is sent from the MES to the SES. This ECC signal contains a component which will cause a third clock pulse train of variable frequency to be supplied to clock input 482 (FIG. 7) of commutator 305 (FIG. 7) in the SES which responds thereto to successively connect (commutate) the tapped outputs 370 of tapped delay line 321 (FIG. 7) to an output lead 307. The input to tapped delay line 319 is the non-phase corrected chip clock timing pulses $C_A$ supplied thereto via lead 358 and conversion unit 357.

As discussed above, it is well known that by successively and cyclically connecting the tapped output of a tapped delay line 319 to single output lead 307 a continuous phase shift is introduced into chip clock pulses $C'_A$. A continuous phase shift is a change in frequency. Thus, by changing the clock pulse rate supplied to clock input 482 of commutator 305 the frequency rate of received (but perhaps incorrect) chip clock signal $C_A$ is changed to a corrected rate $C_A$. Such change in frequency is continued until chip clock signal $C_A$ (derived from $C_C$) is, in fact, phase synchronized with chip clock $C_M$ at the MES of FIG. 4. Perfect synchronization will occur when the count value accumulated in accumulator 315 reaches 0, a realistically unobtainable condition.

More specifically, the chip clock pulses $C_C$ are supplied to the input 381 of tapped delay line 319 (FIG. 7) via lead 358. Thus, by successively connecting output taps 370 to output lead 307 of commutator 305, the chip clock $C_C$ input is, in effect, phase shifted each time a successive tap output is connected to output terminal 307 of commutator 305. Accordingly, the frequency of chip clock signal $C_C$ is altered. The signal appearing on output terminal 307 of commutator 305 is now chip clock signal $C_A$ which is supplied to transmitter 506 of FIG. 6, and is related to the phase of chip clock $C_M$ in that when it (chip clock $C_A$) is transmitted to and received back from the satellite by the MES of FIG. 4, it is synchronized with the received MES chip clock $C_M$.

At this time of synchronization the count value accumulated in accumulator 315 (FIG. 5) will then theoretically become 0 and the rate of the clock pulse supplied to commutator 305 (FIG. 7) will become 0. However, due to many factors such theoretical phase synchronization is not likely to occur and a certain amount of hunting for phase synchronization will always be present, as indicated by the time vs. phase difference curve of FIG. 10. It should be noted that commutator 305 of FIG. 7 can commutate at a very slow rate down to 0 and up to a very high rate whereat the frequency of the chip clock signal $C_A$ can be changed by many clock pulses per second. Thus the phase adjustment between $C_M$ and $C_A$ can be very fast, but with great sensitivity.

The chip clock $C_M$ is generated by transmitter 232 of the MES of FIG. 4, transmitted to the satellite and then transmitted back to the MES via satellite, where it is supplied to the input of phase detector 330 (FIG. 5), the set input of flip-flop 351, and to clock input 350 of counter 360.

Phase detector 330 of FIG. 5 is part of a phase locked loop (PLL) 308 circuit which also includes low pass filter 332, voltage controlled oscillator (VCO) 336 and frequency divide-by-X logic 334. The purpose of PLL 308 is to generate a high frequency output from VCO 336 which is supplied via AND gate 310 to counter 312. The frequency of the output of VCO 336 is determined by the value of X in the divide-by-X circuit 334 and can be, for example, 100. Thus the output frequency of VCO 336 is 100 times the chip pulse $C_M$ rate.

The purpose of the logic within dashed line block 364 is to generate a digital value which can be either positive or negative which is supplied to microprocessor 322 through AND gate 318. This digital value, which is a count value generated in counter 312 and accumulated in accumulator 315, is interpreted by microprocessor 322 which will respond thereto to produce a command for chip clock rate adjustment on its output lead 321 which is one component of the total composite ECC signal and which is sent from the MES to the clock input 482 of commutator 305 (FIG. 7) to cause output taps 370 of tapped delay line 319 (FIG. 7) to be connected to output terminal 307 of commutator 305 at a given rate and in a given direction, as discussed above.

The operation of the logic within the block 364 of FIG. 5 will now be discussed in more detail with the aid of the timing waveforms of FIGS. 8 and 9. For purposes of brevity, the timing waveforms of FIGS. 8 and 9 will be referred to herein as waveform 8B or waveform 9A rather than as waveform A of FIG. 8 or waveform A of FIG. 9.

The pulse trains $C_M$ and $C_A$ are connected respectively to the set inputs of flip-flops 351 and 353 (FIG. 5) and also connected respectively to the set and reset inputs of flip-flop 355. The outputs of flip-flops 351 and 353 are shown in waveforms 8B and 8D when $C_M$ leads $C_A$ in phase, as shown in waveforms 8A and 8C. The output of XOR gate 349 (FIG. 5) is shown in waveform 8E and consists of a high level signal (positive pulses) when the input signals are unequal and a low level signal when the inputs are equal, in accordance with the characteristics of an XOR gate.

The aforementioned positive pulses, represented by a single pulse 347 in FIGS. 5 and in waveform 8E, are supplied to one input of AND gate 310 to enable AND 310 and to allow pulses from VCO 336 to pass therethrough and to up/down counter 312 for the duration of pulse 347. It is evident that the number of pulses supplied to counter 312 depends on the width of pulse 347 which in turn depends upon the phase difference $\Delta\phi$ between $C_M$ and $C_A$.

The supplying of such train of pulses to counter 312 is not, however, by itself sufficient. A polarity sign must also be supplied to counter 312 in accordance with whether $C_M$ is leading or lagging $C_A$ so that counter 312 will count respectively either up or down. Such polarity is determined by the output of flip-flop 355. If $C_M$ leads $C_A$, as is the case shown in the waveforms of FIG. 8, then the set output of flip-flop 355 will be high during the period of the high level outputs from XOR gate 349, as shown in waveforms of 8E and 8F. Since the set output of flip-flop 355 is supplied to the count-up input terminal of counter 312 the counter 312 will count up during the high level output pulses from XOR gate 349.

The counter 312 is always set or reset to a predetermined value Z at the trailing edge of the output pulses from XOR gate 349 so that the next subsequent count value supplied to counter 312 will cause counter 324 to begin counting from the value of Z, either up or down and to avoid an abrupt change from 0 to the capacity of the counter. The latch 317 also contains a value Z which is always subtracted from the final count value of counter 312 by subtract logic 313. Thus, the output of subtract logic 313 is the difference between Z and the final count contained in counter 312 and will have a polarity sign thereon indicated by the most significant bit (MSB) of the output of subtract logic 313. Such difference count value is accumulated in accumulator 315 for each pair of chip clock pulses $C_M$ and $C_A$.

The operation of the logic when $C_M$ lags $C_A$ is shown in the timing waveforms of FIG. 9. Here again the outputs of flip-flops 351 and 353 are represented by waveforms 9B and 9D with XOR gate 349 responding to conditions of different level output signals from flip-flops 351 and 353 to produce the train of output pulses shown in waveform 9E. However, in the case where $C_M$ lags $C_A$, $C_A$ occurs first so that flip-flop 355 is reset during the output pulses from XOR gate 349, as indicated in waveform 9F. Thus, the reset output of flip-flop 355 is high and instructs counter 312 to count down during the time that the output of XOR gate 349 is high. The flip-flop 351 is set by the next occurring $C_M$ clock pulse, thereby terminating the output pulse from XOR gate 349 and also the train of pulses supplied to counter 312 through AND gate 310.

The contents of counter 312 are then read out to subtract logic 313 by the trailing edge of the output pulse 347 from XOR gate 349. Such subtract logic 331 subtracts the output of counter 312 from the value Z in latch 317 to produce a positive difference which is supplied to accumulator 315. Accumulator 315 is enabled by pulse 347 after being delayed in delay logic 309 to permit the settling down of the logic computing the difference value.

When counter 360 reaches its count capacity, which it does every 0.1 second, AND gate 318 is enabled to transfer the total count value accumulated in accumulator 315 for the prior 0.1 second to microprocessor 322. Microprocessor 322 (in the MES) responds to such total count value and its polarity sign to generate a command for clock rate signal adjustment on output lead 321 and a direction command (polarity sign) on output lead 343. Such commands are sent to the clock input 482 (FIG. 7) via bus 422 and the direction input 481 of commutator 305 in the SES, as discussed above re FIG. 7, to control the rate and direction of commutation.

The bit clocks $B_M$ and $B_A$ are also supplied to microprocessor 322 via leads 352 and 356, respectively. After phase sychronization has been obtained between $C_M$ and $C_A$ the processor 322 in the MES computes the difference in time between the received bit clocks $B_M$ and $B_A$ and then sends an ECC signal to the SES of FIG. 7 to alter the timing of bit clock counter 340 of FIG. 7 by that amount of time so that when $B_A$ is transmitted back from the SES of FIG. 7 to the MES of FIG. 4 via the satellite it will be in phase with $B_M$ at the outputs of receivers 214 and 208 of FIG. 4.

The changing of the timing (phase) of $B_A$ is done by resetting counter 340 (FIG. 7) to 0 by a command signal sent from computer 322 in the MES of FIG. 4 which is decoded by decoder 459, and then supplied through lead 338 to counter 340. It is to be noted specifically that $B_A$, as supplied to transmitter 506 of FIG. 6, is not in phase with $B_A$ as it is returned from the satellite nor is it in phase with $B_M$ appearing at the output of receiver 214 of FIG. 4. $B_A$ must have a phase such that when it returns from the satellite it will be in phase with $B_M$ at the output of receivers 214 and 208 of FIG. 4.

The pause period clock generated on output lead 527 (FIG. 7) of the sync adjuster of FIG. 7 is supplied to reset input 531 of counter 558 (FIG. 15) and functions to reset counter 558 to a count of 9500 (the beginning of a pause period) when it occurs.

Referring now to FIG. 10 there is shown a typical case history of how the phase difference $\Delta\phi$ between $C_M$ and $C_A$ can vary in time. The diagram of FIG. 10 shows phase vs. time where the small intervals marked off by dots such as dots 398 represent time periods of 0.1 second. The system is shown starting with a phase error of 0 at time $t_0$. For the case shown, the chip clock $C_A$, as first received at the MES, is running slightly ahead of chip clock $C_M$.

The function of the tracking mode software, shown in FIG. 11 and to be described later herein, is to keep the phase in the dead zone of FIG. 10 which is defined herein as being between the two parallel horizontal lines +a and −a. The dead zone is that range of phase difference between $C_M$ and $C_A$ at the MES which is acceptable to the system. Every 0.1 second the phase is measured and if it is in the dead zone no action is taken. If not, action is taken to generate an ECC signal to correct the phase error.

As soon as the first measurement is taken where the phase is out of the dead zone (in this case slightly higher than +a) at point 397 in FIG. 10 the microprocessor 322 (FIG. 5) takes steps in the form of an ECC signal to decrease the frequency of $C_A$ in order to reduce the phase error. The processor will subsequently ignore all phase difference inputs ($\Delta\phi$) from accumulator 315 (FIG. 5) for the next 0.8 seconds (shown by the three vertical tick marks 396 of FIG. 10 along the horizontal time axis). The foregoing occurs since about 0.5 seconds are required for a phase change ECC signal to be transmitted from the MES to the affected SES via satellite and then the corrected $C_A$ signal to be transmitted back to the MES via the satellite.

Subsequently, 0.8 seconds after the original phase change at the transmitter in the MES, the phase difference is sampled and examined continuously thereafter every 0.1 second (until a new phase change is made). The successive phase differences are measured to ensure that the phase direction is now trending downward back toward the dead zone. As long as the phase is decreasing towards the dead zone no further action is executed by the microprocessor 322 of FIG. 5.

Eventually, however, the decrease in phase of $C_A$ will cause the phase difference to go below +a and into the dead zone. The phase will be continuously monitored thereafter but no action will be taken as long it remains in the dead zone.

After a time, the phase error will fall below the line −a as shown at time 399 in FIG. 10. At this time action is again taken by microprocessor 322 (FIG. 5) which realizes that the frequency of $C_A$ must be increased to reduce the phase error back towards 0. Such action is taken but no monitoring of the results occurs during the next 0.8 seconds. Once monitoring of the phase begins again no further action is taken until the phase error exceeds +a. Action of the foregoing type continues indefinitely.

The phase will continue to increase until the frequency $C_A$ is sufficiently decreased at which time the phase will decrease back towards the dead zone between +a and −a. Thus, the phase continually oscillates within or just above or below the dead zone and the resulting phase error remains far less than 180°. The details of the foregoing tracking procedure as controlled by microprocessor 322 is shown in the flow chart of FIG. 11, which will be described below.

It should be noted at this point that the operation of the system has two modes; the acquisition mode in which chip and bit phase synchronism are initially acquired, and the tracking mode in which chip and bit synchronization are maintained. In the following discussion of the flow diagram of FIG. 11 it is assumed that initial phase synchronization of bit and chip phase synchronization has been acquired and that the system is in the tracking mode. Following a discussion of the flow chart of FIG. 11 a discussion of the flow chart of FIG. 12, which describes the acquisition mode, will be set forth.

Figure 11:
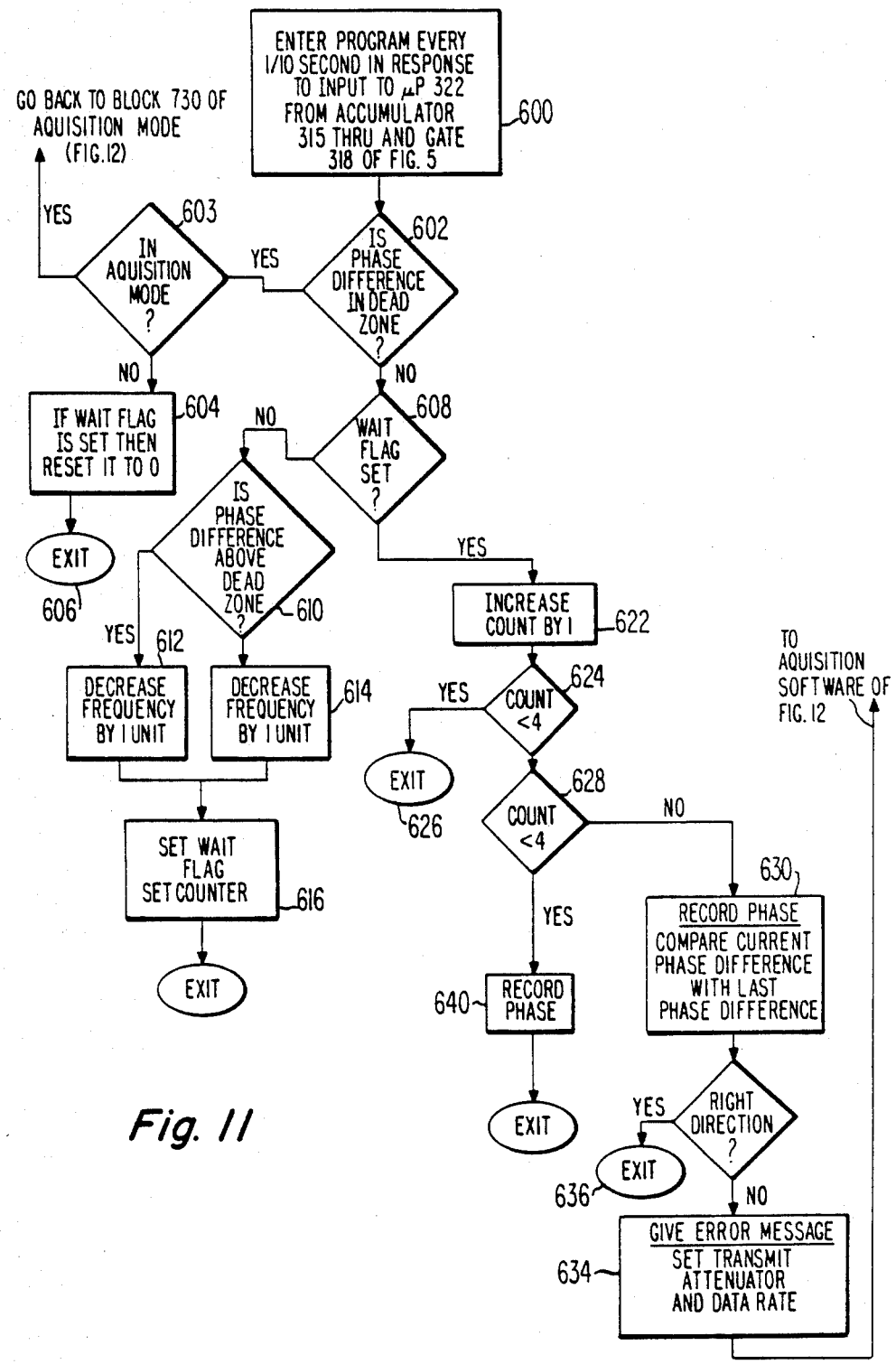
FIG. 11 is a flow chart of the method employed to control the phase differences shown in FIG. 5 during the steady state mode of operation (the track mode)

The operation represented by the flow chart of FIG. 11 is entered into once every 0.1 second in response to the accumulated count which is supplied from accumulator 315 (FIG. 5) through AND gate 318 every 0.1 second under the control of the output of counter 360, as indicated by step 600 of FIG. 11. A decision is made as to whether the phase difference ($\Delta\phi$) between $C_M$ and $C_A$ is within the dead zone, as determined by the count value supplied from accumulator 315 and as also indicated by decision step 602 of FIG. 11. If in the dead zone, a wait flag, which can be a single bit in a known register or memory location in processor 322, is reset to 0 and the program is exited by exit step 606. The program is then re-entered at step 600 at the end of 0.1 second when another count value is supplied from accumulator 315 to processor 322 of FIG. 5.

Assume now that the phase difference has moved out of the dead zone of FIG. 10 so that the logic moves to decision step 608 which determines if the wait flag is set. If not, then the logic moves to the decision step 610 which determines if the phase is above the dead zone. If it is above the dead zone, then the signal is processed, as indicated in step 612, by decreasing the frequency of $C_A$ by one unit of frequency. One unit of frequency is a predetermined amount of frequency corresponding to an amount larger than the maximum possible frequency shift. In the foregoing example where the chip rate is 10 MHz and the maximum frequency shift is 0.1 Hz before leaving the dead zone of FIG. 10 a unit might correspond to 0.1 Hz or more depending on the particular design.

Next, assume the wait flag is set, as indicated in step 616, and also that the counter 622 is set to 0. The program then exits in step 617. The counter 622 can be another register or another memory location in processor 322 of FIG. 5. Returning now to decision step 610, if the phase is not above the dead zone then it must be below the dead zone because it was determined in step 602 that the phase was not in the dead zone. Step 614 then functions to increase the frequency by one unit, set the wait flag, and also set counter 6 to 0.

One-tenth second later the next count value is supplied to computer 322 (FIG. 5) from accumulator 315 of FIG. 5 and the logic of FIG. 11 steps through steps 602 and 608 to step 622 since the wait flag was set in the prior running of the logic. Step 622, as mentioned above, represents the incrementing of the counter, and its count is increased by an increment of 1. Next, the logic checks the accumulated value in counter 622 and, if it is less than 4, exits via exit step 626. One-tenth second later the program is again re-entered and processes the signal through steps 602, 608, 622, and 624 to exit 626 since the count is now only 2 (less than 4).

Eventually, 0.2 seconds later, the count in 622 becomes 4 so that decision step 624 directs the logic to decision step 628 which recognizes that counter 622 contains a count of 4 and therefore records the phase difference in step 640, as evidenced by the last count value supplied from accumulator 315 to processor 322 in FIG. 5, and then exits via exit step 625.

One-tenth second later, the logic of FIG. 11 will again be entered via step 600 and the signal processed through steps 602, 608, 622, 624 and into decision step 628. Since the count is now 5 the program will go to step 630 and record the phase difference, i.e., the latest count value accumulation supplied from accumulator 315 (FIG. 5) and also will compare such latest recorded phase difference ($\Delta\phi$) with the phase difference (count value) recorded in the prior execution of the logic by step 640.

The absolute value of the two recorded phase differences must be decreasing in order for the system to be correcting the phase difference in the proper direction. Therefore, if the count value (the last recorded phase difference) of step 630 is less than the phase difference recorded by step 640 then the logic is exited via exit step 636, the program is re-entered 0.1 second later, and the entire process is repeated. However, if the last recorded phase count value (the last recorded phase) is greater than the phase recorded by step 640 the logic indicates that the phase error is growing and that the system is malfunctioning. Accordingly, step 634 is entered and the logic energized suitable alarm equipment indicating a malfunction.

Figure 12:
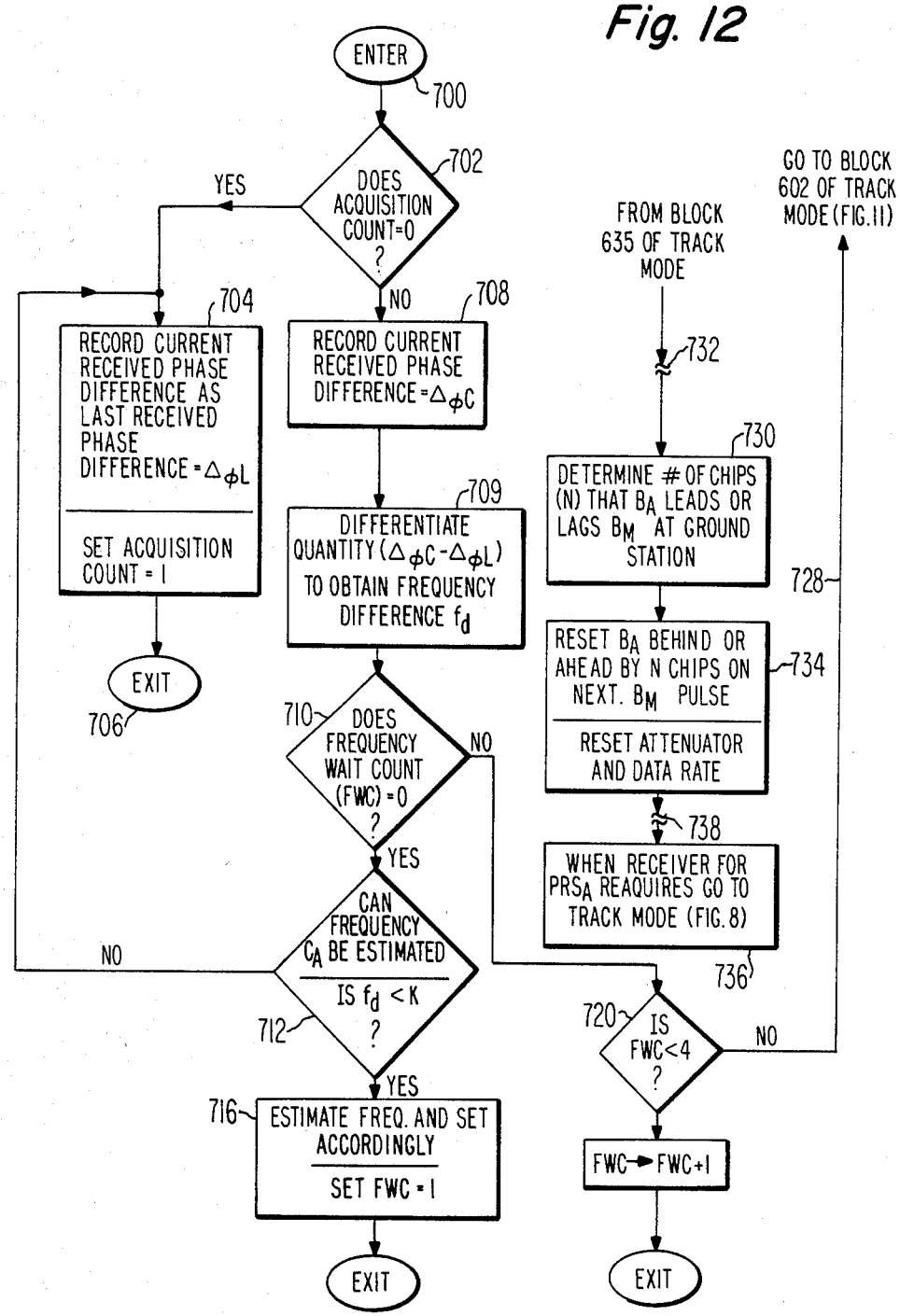
FIG. 12 is another flow chart showing the method of initially acquiring chip and bit synchronization in the system after it is initially activated.

When the equipment is initially turned on, it is necessary to obtain initial synchronization between $C_M$ and $C_A$ and between $B_M$ and $B_A$. During this initial period, identified as the acquisition period, the steps outlined in the flow chart of FIG. 12 are employed. The first step, after entry via step 700, is to check the acquisition count in a designated acquisition counter in decision step 702. If such count is 0, then the signal (attenuated for reasons to be discussed later) is processed as indicated in step 704 by recording the received phase difference, designated as $\Delta\phi_L$, and which is the difference between the $C_M$ and $C_A$ in terms of a value which is representative or, in the present case, indicates directly the phase difference $\Delta\phi_L$ in degrees. The program then exits through exit step 706 and re-enters step 700 0.1 second later. During the next execution of the logic of FIG. 12 the acquisition count is 1 and the currently received phase different $\Delta\phi_C$ is recorded, as shown in step 708. Next, in step 709, the difference between $\Delta\phi_L$ and $\Delta\phi_C$ is taken to obtain the frequency difference $f_d$. Note that the rate of change of phase is the definition of frequency.

Next, in decision step 710 the frequency wait count (FWC) is checked. If FWC is 0, then the logic moves to decision step 712 which determines if the frequency of $C_A$ can be estimated, which determination depends on the value $f_d$. If $f_d$ is less than some predetermined frequency K then the response is yes and the frequency is estimated as shown in step 716, and the frequency wait count (FWC) is set equal ot 1. The program then exits through step 717 and re-enters step 700 0.1 second later.

If the frequency cannot be estimated because $f_d$ is greater than K, as indicated in decision step 712, then the currently received phase difference $\Delta\phi_C$ is stored, as indicated in step 704, and becomes the new last received phase difference $\Delta\phi_L$.

This process continues with each new currently received difference $\Delta\phi_L$ becoming the last received phase difference $\Delta\phi_L$ and differentiation of the quantity $\Delta\phi_C$ minus $\Delta\phi_L$ calculated until $f_d$ is less than K and the frequency can be estimated.

The reason for not acting on changes that are too large is that such phase changes are mathematical rather than real. For example, if $\Delta\phi_L = -179°$ and $\Delta\phi_C = +179°$ the numerical phase change is large (179-(−179)=358) but in reality it is only 2°. Instead of acting the system waits until it has moved away from this discontinuity.

The next time the loop of FIG. 9 is processed the decision step 710 will note that FWC is equal to 1 and the logic will go to decision step 720 where it will be determined if FWC<4. If FWC<4 the logic will go to step 722 where FWC is incremented and the logic exited via step 724 to re-enter step 700 0.1 seconds later.

The foregoing process is continued until FWC=4 at which time decision step 720 will direct the logic to go to step 602 of the track mode of FIG. 11. The signal will then be processed in exactly the same manner as discussed in connection with the discussion of FIG. 11 until the phase difference $\Delta\phi$ between $C_M$ and $C_A$ enters the dead zone, as indicated by decision step 602. Under such circumstance the decision step 603 will recognize that the system is in the acquisition mode and will direct the program to go back to step 730 of the acquisition mode of FIG. 12.

Steps 730, 734, and 736 of FIG. 12 will synchronize $B_M$ with $B_A$. More specifically, after allowing for a round trip transit time to the satellite and back to the MES, indicated by break 732, step 730 will determine the number of chips (N) that $B_A$ leads or lags $B_M$ at the MES. This is done simply by counting the number of chip periods that occur between $B_M$ and $B_A$.

The bit clock pulse phase is then reset by that number of chip periods either behind or ahead of $B_M$ at the next $B_M$ pulse so that when $B_A$ is transmitted to the satellite and then returned it will be in phase with $B_M$ (at the MES). Also, as indicated in step 734, an attenuator 513 of FIG. 6 is removed from the SES logic and the data rate is reset. Next, after another round trip transit time or, more precisely after another 0.8 seconds has elapsed, as indicated by break 538 in FIG. 12, step 736 directs the logic to enter the track mode of operation of FIG. 11.

It is to be noted, that attenuator 513 of FIG. 6 is provided to lower the energy level during acquisition so that it will not interfere significantly with on-line transmission and reception by other stations.

The logic for the detection and recovery of chip and bit sync for the various SESs has been discussed above. There are instances, however, such as initial acquisition, or in the case of disturbance in the system, that the pause period of one or more of the SESs is out of sync with the common pause period. More specifically, the timing of the pause period from one or more of the SESs for the synchronization of the pause periods in one or more of the SES, the pause period of the master signal at the MES must first be acquired or reacquired.

Figure 16:
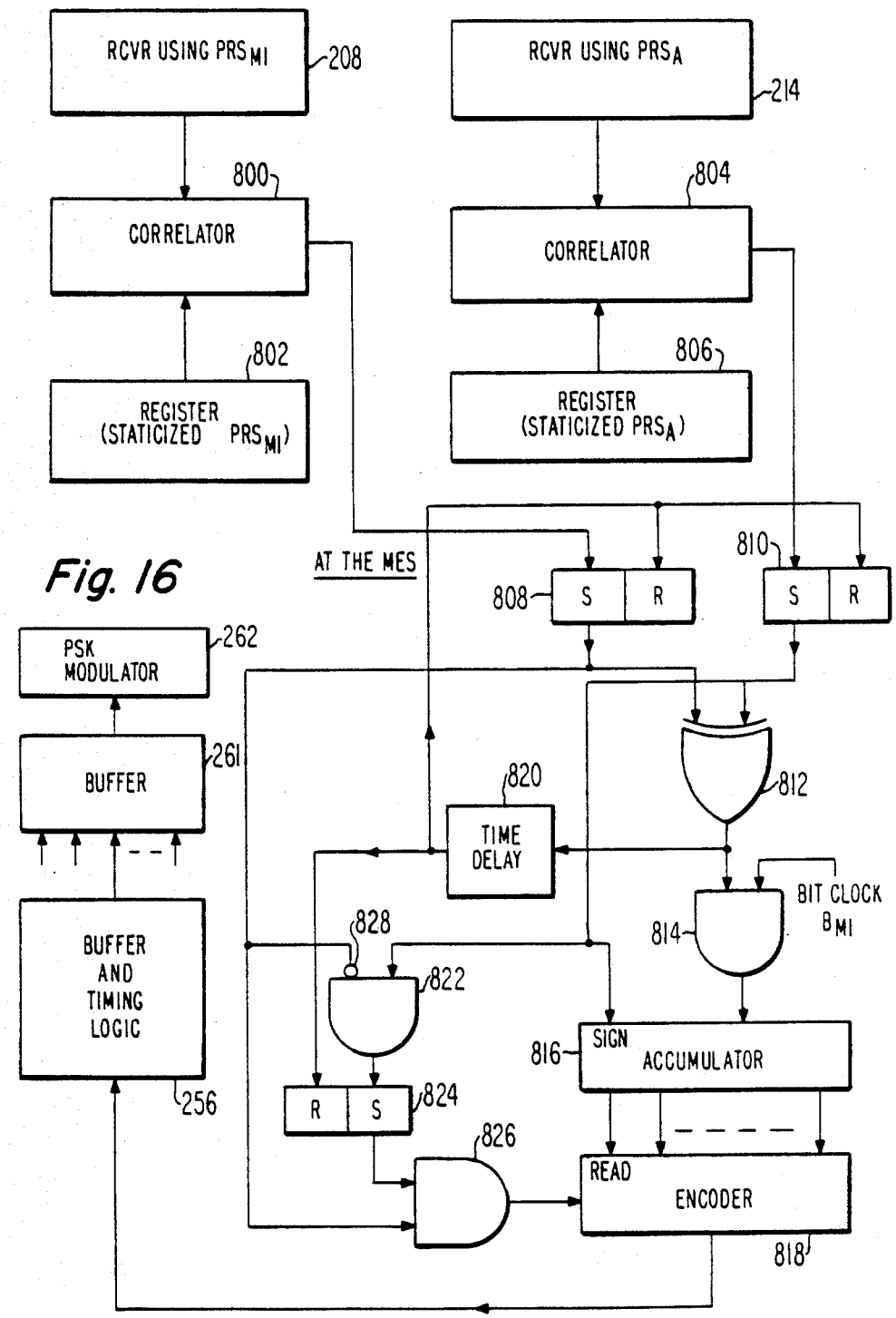
FIG. 16 is a combination block and logic diagram for obtaining pause period synchronization.

The logic of FIG. 16 performs such a function. More specifically, the signal contained in the pause period as generated by the SESs is a known signal and can consist, for example, of 90 consecutive binary ones preceded and followed by a sequence of bits 0 1 0 1 0, which is contained as a staticized binary value in register 806 of FIG. 16. The output of an SES receiver, such as receiver 214 located at the MES, and which decodes the signal from SES 160 of FIG. 1, generates this same signal in its pause period. When correlation occurs the correlator 804 will output a signal to set flip-flop 810. Similarly, when the pause period of the signal $PRS_{M1}$ occurs the correlator 800 will generate an output pulse to set flip-flop 808. If the pause periods of $PRS_A$ and $PRS_{M1}$ are synchronized, the two flip-flops 808 and 810 are set simultaneously and the zero output of Exclusive OR (XOR) gate 812 remains a zero.

On the other hand, if the pause periods of $PRS_{M1}$ and $PRS_A$ are not in synchronism there will be a period of time when one of flip-flops 808 and 810 will be set and the other will be reset. During this time period, the XOR gate 812 will have a high level output to prime AND gate 814 and permit the bit clock pulses $B_M$ to pass therethrough and into accumulator 816. The number of bit clock pulses entering accumulator 816 is a measure of the phase separation of the two pause periods $PRS_{M1}$ and $PRS_A$ terms of bit count. It is this difference in the occurrence of the two pause periods that must be corrected in order to synchronize the pause periods of SES 160 with that of $PRS_{M1}$. The output of flip-flop 810 is also employed to indicate the leading or lagging relationship of the two pause periods being compared. In the particular logic of FIG. 16, if the setting of flip-flop 810 occurs before the setting of flip-flop 808, it indicates that the phase of $PRS_A$ is leading that of $PRS_{M1}$. Accordingly, the number of bit counts accumulated in accumulator 816 must be subtracted from the pause periods of $PRS_A$ in order to synchronize it with the pause period of $PRS_{M1}$.

If flip-flop 808 is set before flip-flop 810 by virtue of pause period of $PRS_{M1}$ occurring first, the sign bit supplied by the set output of flip-flop 810 will indicate that the phase difference, as measured in bit clock pulses, must be added to the timing of the pause period $PRS_A$ from SES 160 in order to synchronize the two pause periods of $PRS_A$ and $PRS_{M1}$. In the event that the pause period of $PRS_{M1}$ does occur first and flip-flop 808 is set before flip-flop 810, AND gate 826 will be primed.

On the other hand, if the pause period of $PRS_A$ occurs first, then flip-flop 810 will be set before flip-flop 808 so that AND gate 822 will become conductive to set flip-flop 8 thereby also priming AND gate 826. Thus, when flip-flop 808 is later set by the occurrence of the pause period of $PRS_{M1}$ the AND gate 826 will be enabled to cause a readout of the value contained in encoder 818. Such value is a binary encoded equivalent of the quantity contained in accumulator 818 and is supplied to buffer and timing logic 256 and subsequently to the buffer 261 and to the PSK modulator 262 which corresponds to the similarly identified logic elements in FIG. 4.

It can be seen that the occurrence of the pause period of $PRS_{M1}$ must occur after the completion of the pause period of $PRS_A$ if the ECC signal generated by $PRS_A$ in encoder 818 is to be included in the ECC signal to be transmitted back to the receiving SES. This condition is necessary to avoid the conflict which would arise if the next common pause period begins before the completion of the pause period of the received SES signal ($PRS_A$).

To avoid the latter possibility, the set output of flip-flop 808 is supplied to an inhibit input of AND gate 828 so that if the pause period of $PRS_{M1}$ occurs first, the set output of flip-flop 810 cannot pass through AND gate 822 to set flip-flop 824. Thus, AND gate 826 will remain disabled in the sequence of occurrence of the two pause periods where the pause period of $PRS_{M1}$ occurs before the pause period of $PRS_A$.

A time delay 820 introduces a short time delay at the output of the XOR gate 812 which delayed output is supplied back to the reset inputs of flip-flops 808, 810, and 824 to reset the entire circuit for the reception of the beginnings of the next two pause periods being considered.

There are occasions when it is desirable to send status messages directly from the MES to one or more of the SESs. For example, after acquisition of sync has been completed, it is necessary to remove the attenuator 413 (FIG. 6) from the SES since there is no longer a conflict between the SES whose synchronization is being acquired and the remaining SESs in the operating mode. Such a status message can be sent to the SES by generating a status message within the microprocessor 322 of FIG. 5 with a preamble using $PRS_{M1}$ and which eventually will pass through despreader 410 of FIG. 6 and be supplied to decoder 409. Decoder 409 will respond thereto to activate the MUX switch 408 and supply the output of despreader 410 to receiver 522 (as opposed to the output of despreader 412) which responds to the PRS output of another SES (SES C) in the system.

A coded message can then follow, also encoded by $PRS_{M1}$, which passes through despreader 410 (FIG. 6)

to receiver 522 and ultimately to buffer 416 and data sync 418 to a decoder 419. Decoder 419 supplies the decoded message to MUX 451 which switches the attenuator 413 out of the circuit and supplies the output of RF filter 438 directly to duplexer 440 for the normal mode of operation.

As another example of a status message, assume that an SES has suddenly acquired sync. The MES can recognize such acquisition of sync and can then send a message to the SES using $PRS_{M1}$ and then firstly, assuming the SES to be despreading with $PRS_{M1}$, can instruct the SES by means of decoder 409 and MUX 408 to connect the output of despreader 410 to the receiver. Next a message can be sent informing the SES that sync has been obtained and that messages can be then sent to another SES. Also, the MES can instruct the SES to disconnect the attenuator 413 from the SES by means of a coded signal supplied from decoder 419 to MUX 451.

What is claimed is:

1. A communication system comprising:
   a satellite;
   a master earth station (MES);
   a plurality of small earth stations (SES) each comprising first means including a signal transmission means for generating signal transmissions addressed and transmittable to a selectable other SES via the satellite, the MES, and then the satellite again;
   said satellite comprising first signal processing means responsive to said signal transmissions from said SESs to retransmit said signal transmissions to said MES;
   said signal transmissions consisting of a stream of bits representing orthogonal pseudo random sequence (PRS) signals ($PRS_{SES}$) which in turn consist of chips arranged in predetermined and identifiable patterns and with periodic pause periods in said streams of PRS signals and with bit, chip and pause period occurrence rates $B_{SES}$, $C_{SES}$, and $P_{SES}$, respectively, being synchronized with each other as they arrive at the MES;
   said MES comprising means responsive to said signal transmissions from said satellite to amplify and retransmit said signal transmissions as a composite signal with a common pause period to said satellite;
   said satellite comprising second signal processing means responsive to said signal transmissions from said MES to retransmit said signal transmissions to said SESs;
   said MES comprising logic to compare the phases of the $B_{SES}$, the $C_{SES}$, and the $P_{SES}$ of all of the $PRS_{SES}$ signals and to generate error correction command (ECC) signals defining the deviation of the phase of any of said $B_{SES}$, said $C_{SES}$, or said $P_{SES}$ from common synchronization as they arrive at said MES; and
   said MES and said SESs further comprising cooperative means responsive to said ECC signals to maintain synchronism between the bit and chip rates of said $PRS_{SES}$ signals as they arrive at said MES.

2. In a data communication system including a plurality of small earth stations (SES), a satellite, and a master earth station (MES), a method of transmitting signal transmissions each consisting of a series of time synchronous orthogonal pseudo random sequence (PRS) signals, each in turn consisting of N time synchronous chips arranged in a predetermined pattern, from a first SES to a second SES and comprising the steps of:
   generating a stream of PRS signals consisting of bits and chips of bit and chip rates $B_{SES}$ and $C_{SES}$ at selected ones of said SESs and having pause periods occurring periodically in said stream of PRS signals;
   transmitting said PRS signals to said satellite and then from said satellite to said MES as a single composite signal with $B_{SES}$ and $C_{SES}$ and the pause periods all synchronized;
   determining if each $B_{SES}$, $C_{SES}$ and the pause periods of all of said PRS signals from said SESs are in common phase synchronization with each other at the time of arrival thereof at said MES;
   generating an error correction code (ECC) defining the amount and direction of phase error with respect to said common phase synchronization of any of said $B_{SES}$, $C_{SES}$ or pause periods;
   transmitting said composite signal from said MES to said SESs with common periodic pause periods therein and with said ECC signal contained in one or more of said common pause periods; and
   correcting the phase of the $B_{SES}$, $C_{SES}$, and pause period of each $PRS_{SES}$ at said SESs so that they are all in phase synchronization with each other at the time of arrival thereof at said MES.

3. In a data transmission system comprising a plurality of small earth stations (SES), a master earth station (MES), and a satellite, a method of transmitting data between a first selectable SES ($SES_A$) and a second selectable SES (SEShd C) via said satellite and the MES, where a data bit is encoded on each of a string of orthogonal pseudo random sequence (PRS) signals at a bit rate $B_{SES}$ each of said PRS signals in turn consists of W chips arranged in a predetermined pattern with a chip rate $C_{SES}$, and comprising the steps of:
   generating PRS signals $PRS_A$ and $PRS_C$ with periodic pause periods at said first and second SESs for first hop transmissions to said MES via said satellite;
   generating a PRS signal $PRS_M$ of chip rate $C_M$ and bit rate $B_M$ at said MES with periodic pause periods therein followed by the transmission to and the reception back of said $PRS_M$ signal from said satellite;
   determining the phase difference between $B_A$, $C_A$, and the periodic pause periods of $PRS_A$ and $PRS_M$ at said MES;
   generating an error correction command (ECC) signal defining the amount and direction of said phase differences;
   detecting the occurrence of the pause period in all of the PRS signals originating in the SESs upon their first hop arrival at the MES from the SESs;
   creating a common pause period for retransmission from the MES of the PRS signals received from the SESs and for the transmission of the $PRS_M$ signal from the MES;
   inserting said ECC signal in said common pause period;
   transmitting all of the PRS signals received from the SESs and the $PRS_M$ signal as a composite signal from the MES to said satellite as a second hop transmission;
   detecting and decoding the ECC signal containing the common pause period at the SES to which the ECC signal is addressed; and correcting the phases of $B_A$, $C_A$ and the pause period of $PRS_A$ so that they will be in synchronism with the phases of $B_M$, $C_M$, and the pause period of the returned $PRS_M$ at the MES after $PRS_A$ has been transmitted to the MES via said satellite.

4. A communication network comprising:

a satellite;

a master earth station (MES);

a plurality of small earth stations (SES) each comprising logic comprising only one transmitter for generating and transmitting in a first transmission hop to said MES via said satellite a stream of orthogonal pseudo random sequence (PRS) signals $PRS_{SES}$ each consisting of a plurality of chips occurring at a chip rate $C_{SES}$ and arranged in orthogonal patterns unique to said each SES, and with each PRS signal representing a bit and further with said streams of PRS signals each having periodic pause periods therein consisting of a predetermined number of bit periods for receiving error correction command (ECC) signals;

said MES comprising:

means for generating, transmitting and then receiving back from said satellite a PRS signal $PRS_M$ having a bit and chip clock rate $B_M$ and $C_M$, respectively;

said MES further comprising means for receiving the PRS signals ($PRS_{SES}$) and for generating a signal in response to the phase difference between $C_M$ and the $C_{SES}$ of each SES, between $B_M$ and the $B_{SES}$, and between the pause periods of each SES as they arrive at the MES indicating the amount and direction of such phase differences;

said MES further comprising logic for retransmitting the received $PRS_{SES}$ signals as a composite signal with a common periodic pause period therein and for inserting in such common pause periods the generated ECC signal; and each of said SESs comprising logic responsive to an ECC addressed thereto to correct the phases of the $B_{SES}$, the $C_{SES}$, and the pause period of the $PRS_{SES}$ unique thereto so that said $B_{SES}$, said $C_{SES}$, and said pause periods are synchronized with $B_M$, $C_M$, and the pause period of $PRS_M$ as returned from the satellite, at the MES.

5. In a data transmission system comprising a plurality of small earth stations (SES), a master earth station (MES), and a satellite, a system for transmitting data from a first $SES_A$ to said MES via said satellite in a first transmission hop and then from said MES to a second $SES_B$ via said satellite in a second transmission hop and comprising:

a transmitter and a receiver at said first and second SESs for transmitting and receiving a string of time synchronous pseudo random sequence (PRS) signals with periodic pauses P therein which are synchronous when received at said MES and with a PRS signal ($PRS_{SES}$) uniquely coded to each SES and with each PRS signal $PRS_{SES}$ representing a data bit of bit rate B and having a chip rate C;

comparing means at said MES for comparing C, B, and P of the PRS signals ) received from each SES at the MES as a composite PRS signal with the bit, chip, and pause rate, $B_M$, $C_M$, and $P_M$ of a PRS signal $PRS_M$ transmitted from the MES and received back from the satellite by the MES to generate an error correction command (ECC) signal which defines the amount and direction of phase difference between C, B, and P of the PRS signal $PRS_{SES}$ generated by each SES and $C_M$, $B_M$ and $P_M$ generated by the MES respectively; and means for retransmitting the received PRS signals to $SES_A$ and $SES_B$ with the ECC signal occurring during the said common pause period of the retransmitted PRS signals;

said first $SES_A$ comprising logic responsive to the ECC signal transmitted from said second $SES_B$ via the satellite and said MES to correct the phases of B, C, and P of the PRS signals generated at said first $SES_A$ to be synchronized with the phases of $B_M$, $C_M$ and $P_M$ at the time of arrival of the components of the PRS signals having rates of B, C, P, $B_M$, $C_M$, and $P_M$ at the MES.

6. A transmission system as in claim 5 in which each SES comprises means for generating a train of $M = N - X$ data bits at a bit rate of B of N bits followed by a pause period of X data bit periods where $M >> X$; and in which said MES further comprises:

means for detecting the pause period in each $PRS_{SES}$ signal;

means for generating a common pause period for retransmission of said composite PRS signal to $SES_A$ and $SES_B$; and means for inserting ECC signal in said common pause period for subsequent transmission to said first $SES_A$; and in which said first $SES_A$ comprises logic for detection of the ECC signal transmitted in said common pause period of the transmission from the MES via said satellite and the decoding of the ECC signal contained therein to correct the phase of B, C, and P of the PRS of $SES_A$.

* * * * *